(12) United States Patent
Taguchi

(10) Patent No.: US 11,485,527 B2
(45) Date of Patent: Nov. 1, 2022

(54) BINDING MACHINE

(71) Applicant: MAX CO., LTD., Tokyo (JP)

(72) Inventor: Satoshi Taguchi, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 16/998,983

(22) Filed: Aug. 20, 2020

(65) Prior Publication Data

US 2021/0053706 A1 Feb. 25, 2021

(30) Foreign Application Priority Data

Aug. 23, 2019 (JP) .............................. JP2019-153218

(51) Int. Cl.
 *B65B 13/02* (2006.01)
 *B65B 13/04* (2006.01)
 *B65B 13/34* (2006.01)

(52) U.S. Cl.
 CPC ............ *B65B 13/025* (2013.01); *B65B 13/04* (2013.01); *B65B 13/345* (2013.01)

(58) Field of Classification Search
 CPC ..... B65B 13/025; B65B 13/04; B65B 13/345; A11G 17/08; G01B 3/1005; G01B 3/1007
 See application file for complete search history.

(56) References Cited

U.S. PATENT DOCUMENTS

| | | | | |
|---|---|---|---|---|
| 6,032,896 A | * | 3/2000 | Liu | G01B 3/1005 242/379 |
| 6,182,916 B1 | * | 2/2001 | Lin | G01B 3/1005 242/396.9 |
| 2017/0359972 A1 | * | 12/2017 | Hayashi | A01G 17/08 |
| 2017/0361957 A1 | * | 12/2017 | Takemura | B65H 35/04 |

FOREIGN PATENT DOCUMENTS

| | | |
|---|---|---|
| EP | 1430971 A1 | 6/2004 |
| EP | 3257362 A1 | 12/2017 |
| JP | 2005-224197 A | 8/2005 |
| JP | 2005224197 A * | 8/2005 |
| JP | 2017-221149 A | 12/2017 |
| KR | 10-1347857 B1 | 1/2014 |

OTHER PUBLICATIONS

Extended European Search Report for European Application No. 20191946.1-1011, dated Jan. 19, 2021, (8 pages).

* cited by examiner

*Primary Examiner* — Anna K Kinsaul
*Assistant Examiner* — Luis G Del Valle
(74) *Attorney, Agent, or Firm* — Weihrouch IP

(57) ABSTRACT

A binding machine, includes an accommodating portion configured to accommodate a tape reel, which has a tubular bobbin and a tape wound around an outer circumferential surface of the bobbin, with a part of the tape pulled out of the accommodating portion. The accommodating portion includes: a side wall configured to face a side surface of the accommodated tape reel, a first protrusion protruding from the side wall and configured to fit to the bobbin of the accommodated tape reel so as to rotatably support the tape reel, and a second protrusion protruding from the side wall and configured to abut with a side surface of the accommodated tape reel.

6 Claims, 18 Drawing Sheets

BINDING MACHINE

CROSS REFERENCE TO RELATED APPLICATIONS

This application claims priority to Japanese Patent Application No. 2019-153218 filed on Aug. 23, 2019, the content of which is incorporated herein by reference.

TECHNICAL FIELD

The present invention relates to a binding machine.

BACKGROUND ART

A horticultural binding machine has been used for binding work during cultivating of agricultural crops. For example, in cultivating of agricultural crops such as cucumbers, grapes, tomatoes, pears, and plums, a horticultural binding machine has been used in order to bind vines and stems of plants to struts and nets. The binding machine includes a tape magazine unit for accommodating a tape reel around which a binding tape is wound.

A binding machine described in JP-A-2017-221149 can prevent a binding tape from returning even for tape reels having different inner diameters. As shown in FIG. 9 of JP-A-2017-221149, the binding machine includes a lever member 86 provided in a tape magazine unit 80. By abutting different parts of the lever member 86 with an inner diameter part of the tape reel, the binding machine can apply an appropriate braking force to the tape reel at both a small-diameter part and a large-diameter part.

In a binding machine described in JP-A-2005-224197, a U-shaped projection portion 25 elastically abuts with an inner peripheral surface of a tape hub support boss 22 to push the tape hub support boss 22 outward in a radial direction, and thus reverse rotation of the tape reel can be prevented.

However, a clincher arm is always biased by a tension spring in a direction away from a main handle. When a user weakens a force of gripping an operation handle, a binding tape may be largely pulled out due to a biasing force of the tension spring, and a tape reel may continue to rotate normally due to inertia. In particular, when the tape is excessively pulled out in a case where a remaining amount of the tape is large, the tape may jump out of the tape magazine unit and may be caught by a branch or a leaf.

SUMMARY OF INVENTION

Embodiments of the present invention provide a binding machine capable of preventing excessive normal rotation of a wound binding tape during pulling out of the binding tape along with a gripping operation or a binding operation.

According to an aspect of the present invention, a binding machine includes: an accommodating portion configured to accommodate a tape reel, which has a tubular bobbin and a tape wound around an outer circumferential surface of the bobbin, with a part of the tape pulled out of the accommodating portion; a main handle configured to hold the tape pulled out from the accommodating portion; and a clincher arm attached to the main handle rotatably in a first direction toward the main handle and a second direction away from the main handle, and configured to grip the tape held by the main handle by rotating in the first direction and further pull out the tape by rotating in the second direction after the gripping. The accommodating portion includes: a side wall configured to face a side surface of the accommodated tape reel, a first protrusion protruding from the side wall and configured to fit to the bobbin of the accommodated tape reel so as to rotatably support the tape reel, and a second protrusion protruding from the side wall and configured to abut with a side surface of the accommodated tape reel.

DESCRIPTION OF EMBODIMENTS

Hereinafter, embodiments of the present invention will be described with reference to the drawings. The following embodiments are examples for describing the present invention and are not intended to limit the present invention to only the embodiments.

Figure 1:
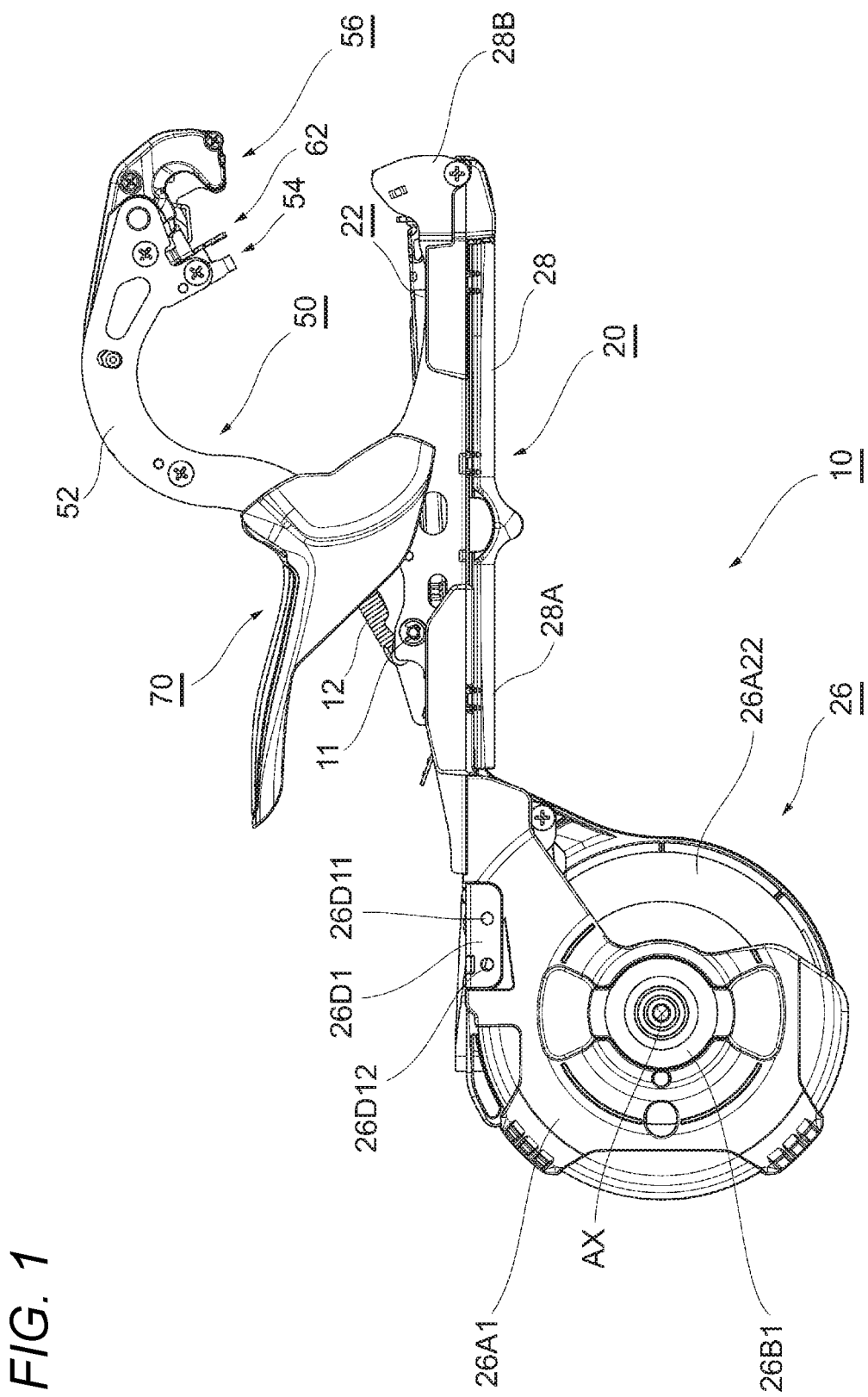
FIG. 1 is a left side view of a binding machine.
Figure 2:
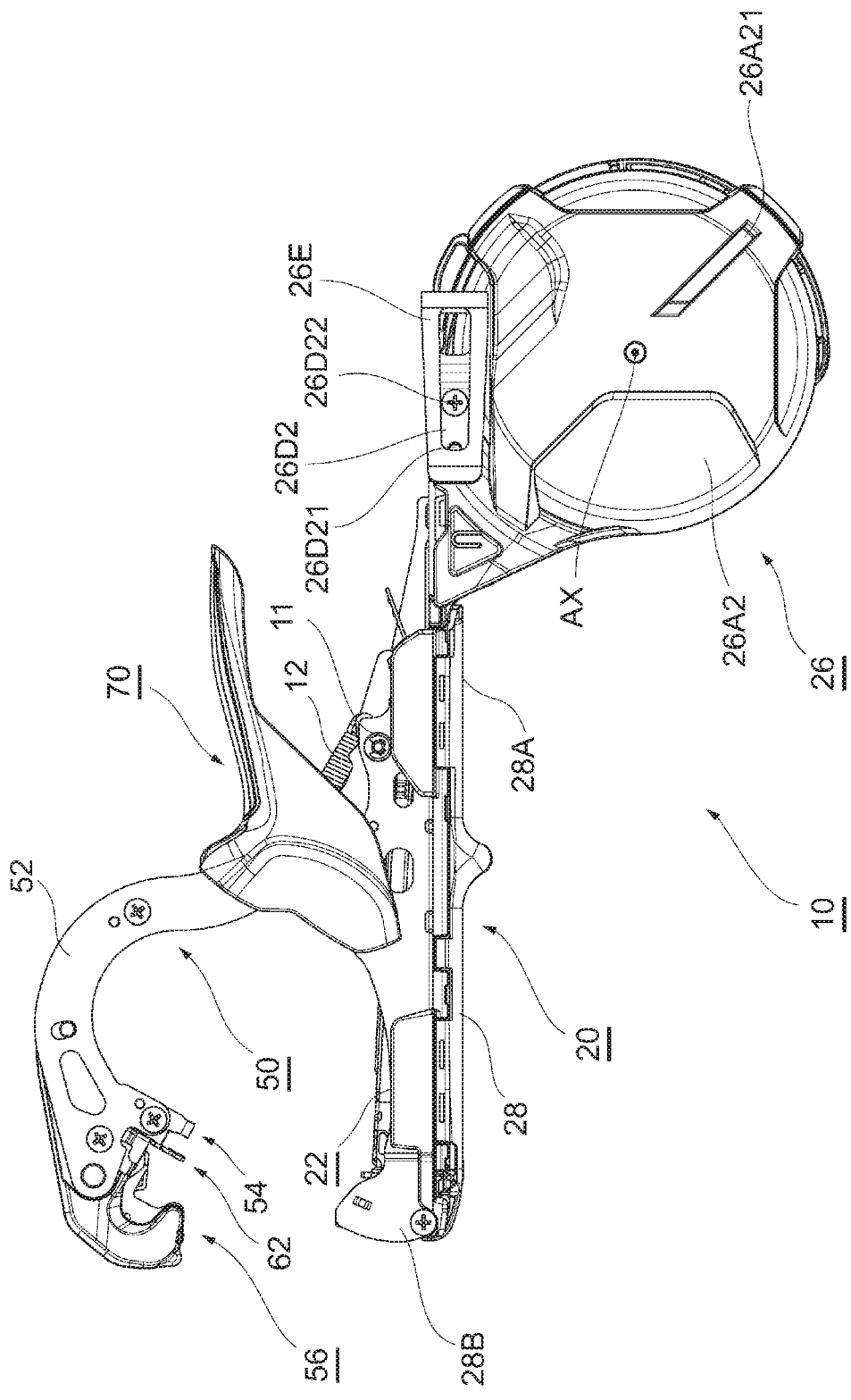
FIG. 2 is a right side view of the binding machine.
Figure 3:
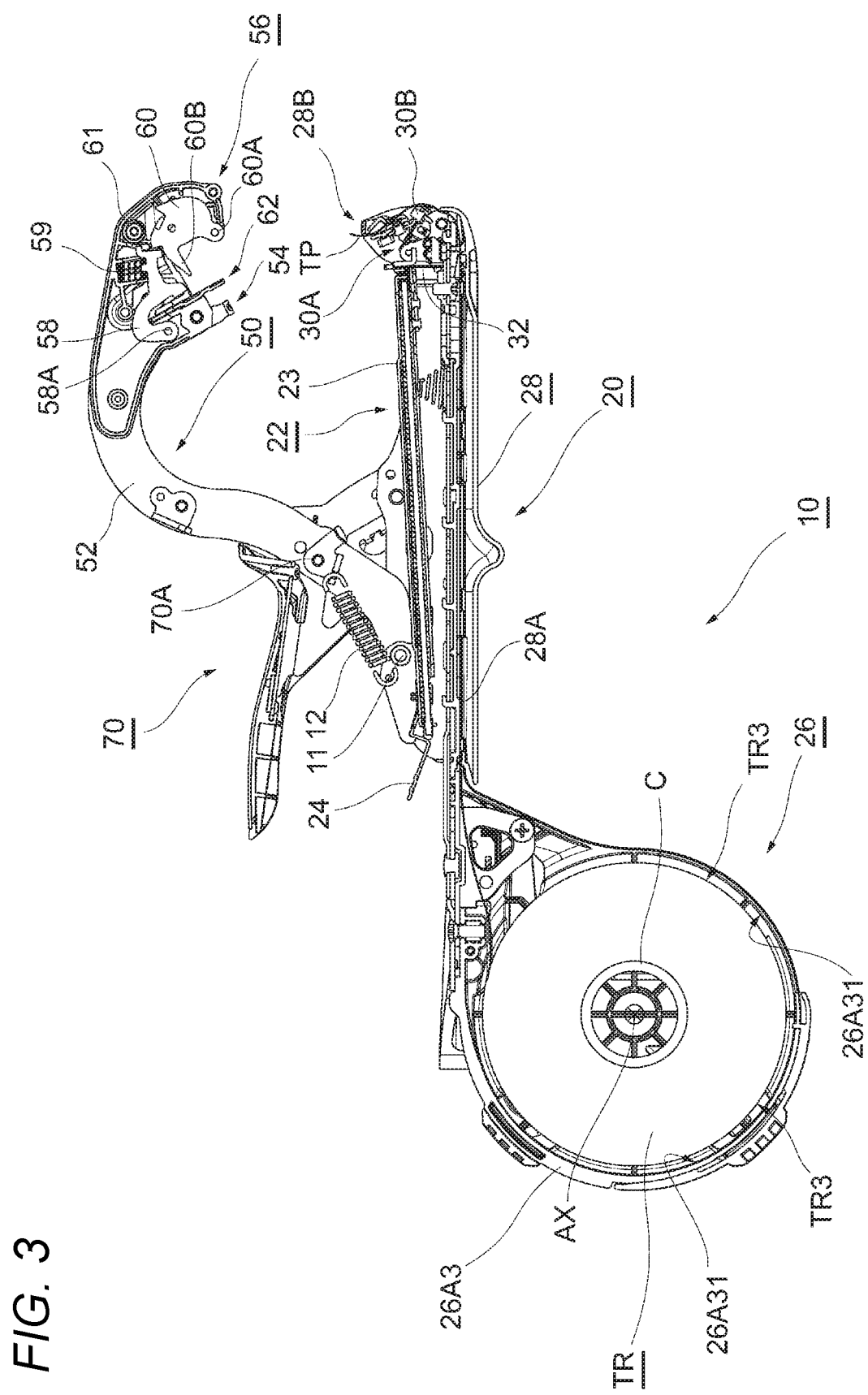
FIG. 3 is a cross-sectional view of the binding machine in a standby state.

FIGS. 1 and 2 are right and left side views of a binding machine 10 for gardening according to the present embodiment. FIG. 3 is a cross-sectional view of the binding machine 10 in FIG. 1.

In the present embodiment, for convenience, a side (right side in FIG. 1 and left side in FIG. 2) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1) may be referred to as a "rear side". Further, a side (upper side in FIGS. 1 and 2) toward which the tape TP is pulled out from the tape guide 28B, heading for a tape holding unit 56 in a standby state, may be referred to as an "upper side", and an opposite side (lower side in FIG. 1) may be referred to as a "lower side".

A main configuration of the binding machine 10 will be outlined below. Hereinafter, a characteristic structure of the binding machine 10 will be described in detail.

The binding machine 10 for gardening according to the present embodiment can be used, for example, in attraction binding operations on an agricultural crop (an example of an "object S to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). As illustrated in FIG. 1 and the like, the tape magazine unit 26 is provided at the rear end portion of the main handle 20. A configuration of the staple magazine unit 26 will be described in detail later.

The tape transport unit 28 includes the tape holder 28A and the tape guide 28B. The tape holder 28A is a path for transporting the tape TP from the tape magazine unit 26 to the tape guide 28B, and is laid along a longitudinal direction of the main handle 20. The tape holder 28A includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side along the longitudinal direction as a fulcrum, for example.

The tape guide 28B (FIGS. 3 to 9) is a member that guides a tip of the tape TP upward from the tape holder 28A. The tape guide 28B is rotatably provided at a front end portion of the tape holder 28A. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 30A. During replacement of the cutting blade 30A, the lock mechanism 30B releases locking of the cutting blade 30A and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 28B is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP. As a mechanism that cuts the tape TP, various mechanisms can be employed. For example, the tape TP may be rotated in conjunction with the tape guide 283, thereby cutting the tape TP; the tape guide 28B and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 is a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST. When the clincher arm 50 to be described below rotates in a closing direction with respect to the main handle 20, the staple magazine unit 22 is pressed by the clincher arm 50 to rotate in a direction of approaching the main handle 20. Therefore, an upper end of the staple driver 32 attached to the main handle 20 relatively enters a part or a space in the staple accommodating portion 23 to drive a leading staple ST in the staple accommodating portion 23 upward. The driven staple ST is clinched by a clincher 54 after penetrating the tape TP. Two overlapped tapes TP can be held between bent leg portions 101 and 102 of the staple ST and a crown portion 100 of the staple ST.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

The staple magazine unit 22 includes the staple accommodating portion 23 that accommodates the staple ST, and a pusher unit 24. The staple accommodating portion 23 is disposed along the longitudinal direction of the main handle 20. In order to accommodate the staple ST therein, the staple accommodating portion 23 includes a bottom surface formed to be elongated along the longitudinal direction of the main handle 20, two sidewall surfaces standing from the bottom surface and facing each other, and a front wall surface against which a side surface of the leading staple ST is pressed.

In the staple accommodating portion 23, a plurality of staples ST can be accommodated. Adjacent staples ST can be connected to each other with an adhesive, for example, to form a column of a staple group as a whole.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft portion 11 provided in a vicinity of a rear end portion so as to be rotatable with respect to the main handle 20, and is biased by a tension spring 12 in an opening direction in which a gap between the clincher arm 50 and the main handle 20 increases. The clincher arm 50 includes an arm portion 52, the clincher 54, and the tape holding unit 56 (an example of a "holding unit").

The arm portion 52 has a shape that extends in a curved manner up to a tip portion so that a C-shaped opening can be formed between the arm portion 52 and the main handle 20.

The clincher 54 is a member that bends and clinches leg portions of the staple ST. The clincher 54 is provided at a tip portion of the clincher arm 50 so as to face a tip of the staple driver 32 when the clincher arm 50 rotates in the closing direction. With such a configuration, the leg portions of the staple ST driven by the staple driver 32 are clinched by the clincher 54 and bent inward. The configuration including the clincher 54 that is provided on the clincher arm 50 and that is for performing binding processing may be referred to as a "binding portion".

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62. The lock plate 58 is configured to be rotatable with a shaft portion 58A provided at one end portion thereof serving as a fulcrum, and the other end portion thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62. The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61. The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

Hereinafter, the characteristic structure of the binding machine 10 will be described in detail.

Tape Magazine Unit

Figure 10:
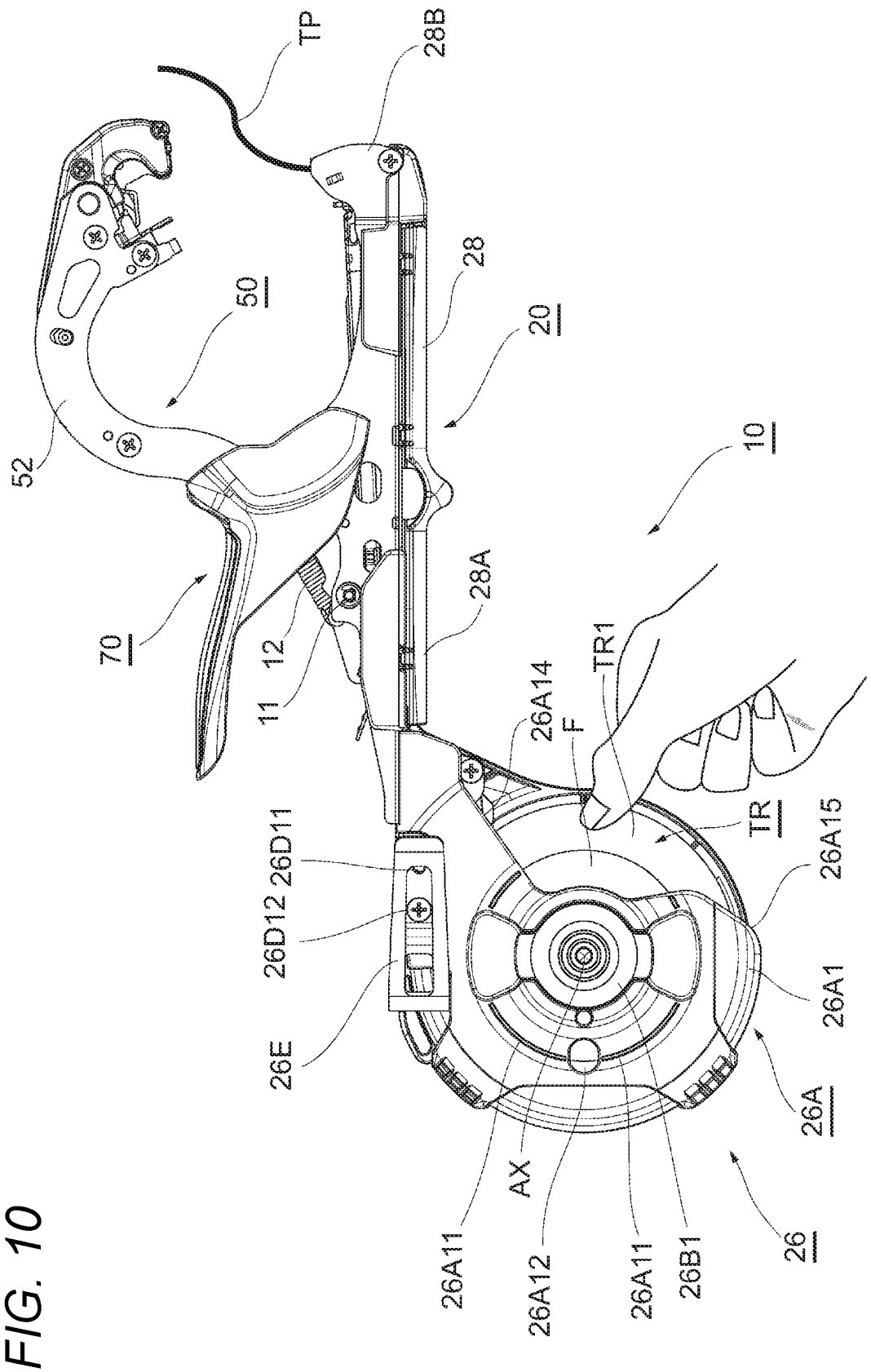
FIG. 10 is a diagram showing a state where a tape reel is mounted to the binding machine.
Figure 11A:
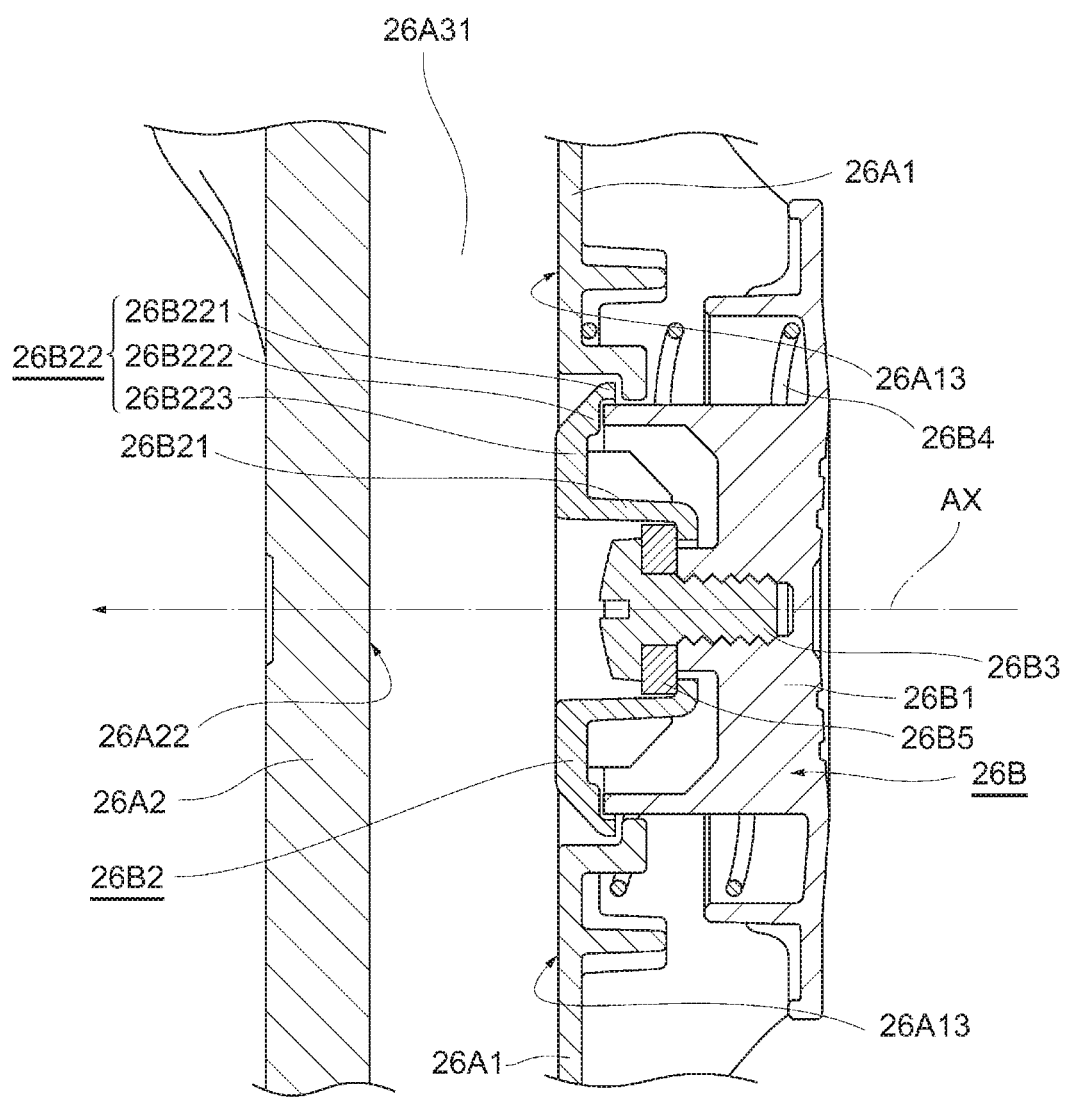
FIG. 11A is a cross-sectional view of a main part of a tape magazine unit.
Figure 11B:
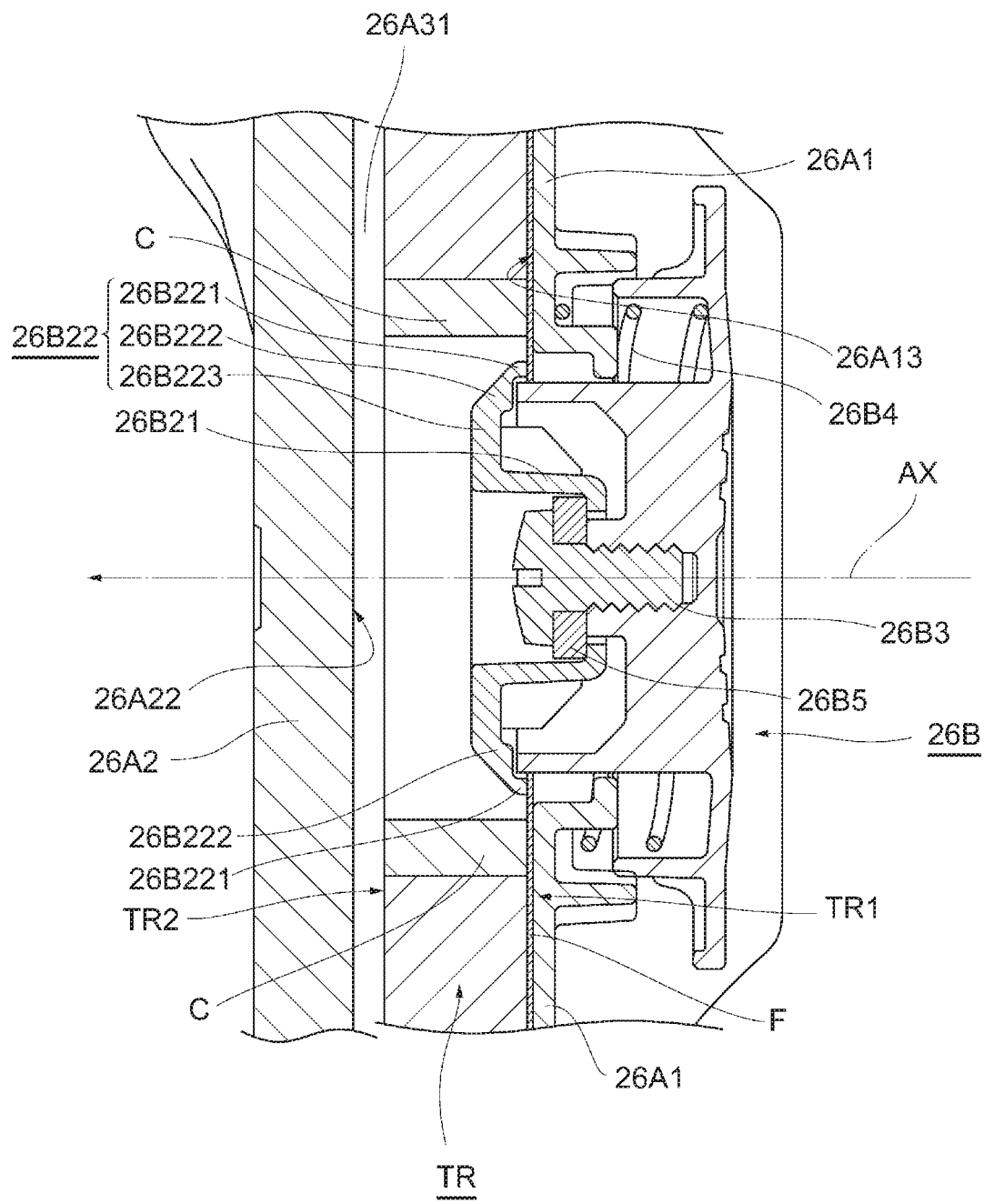
FIG. 11B is a cross-sectional view of the main part of the tape magazine unit when the tape reel is mounted.

FIG. 10 is a diagram showing a state where the tape reel TR is mounted to the tape magazine unit 26. FIG. 11A is a cross-sectional view of a main part of the tape magazine unit 26 in a state before the tape reel TR is mounted, taken along a cross section including an axis AX of a bobbin case 26A (an example of an "accommodating portion"). FIG. 11B is a cross-sectional view showing a state when the tape reel TR is mounted in FIG. 11A.

As shown in the figures, the tape magazine unit 26 includes the bobbin case 26A and a holding unit 26B (an example of an "engaging portion") for holding the tape reel TR. The bobbin case 26A is formed in a substantially cylindrical shape around the axis AX to accommodate the cylindrical tape reel TR having a height corresponding to the width of the tape TP. An axis AX direction refers to a direction parallel to the axis AX. For convenience, in the axis AX direction, a left direction in FIGS. 11A and 11B (a direction from a front surface portion 26A1 to a back surface portion 26A2 to be described later) may be referred to as an axis AX positive direction, a right direction in FIGS. 11A and 11B (a direction from the back surface portion 26A2 to the front surface portion 26A1 to be described later) may be referred to as an axis AX negative direction.

The bobbin case 26A has the front surface portion 26A1 (an example of a "side wall portion") having a shape in which a substantially circular shape is partially cut out, the back surface portion 26A2 (an example of the "side wall portion", FIG. 2) formed in a substantially circular shape, and a circumferential portion 26A3 that connects the front surface portion 26A1 and the back surface portion 26A2. The front surface portion 26A1, the back surface portion 26A2, and the circumferential portion 26A3 may be integrally formed, or may be composed of one or a plurality of separable components. For example, the bobbin case 26A may be formed by integrally forming the front surface portion 26A1 and the circumferential portion 26A3 and connecting the back surface portion 26A2 to the front surface portion 26A1 and the circumferential portion 26A3. A side wall portion of the bobbin case 26A refers to a member having a side wall facing a side surface TR1 or a side surface TR2 of the tape reel TR which is formed into a circular shape by being wound. The circumferential portion refers to a member that connects two side wall portions respectively provided facing the two side surfaces TR1 and TR2 of the tape reel TR and that faces a surface TR3 of an outermost tape TP of the tape reel TR.

An outer surface of the front surface portion 26A1 is provided with ribs 26A11 composed of one or a plurality of concentric projection portions around the axis AX. The rib 26A11 may be, for example, an emboss formed by embossing. Further, the rib 26A11 may be an arc extending in a circumferential direction. One of the ribs 26A11 is preferably an arc or circle having the same diameter as a film F of the tape reel TR. In order to intersect the ribs having the same diameter as the film F of the tape reel TR, a circular hole 26A12 having a small diameter is formed in a region on a rear side of an outer surface of the front surface portion 26A1 to communicate with an internal region for accommodating the tape reel TR. Further, the holding unit 26B to be described later is disposed in a central portion of the front surface portion 26A1 including the axis AX. The holding unit 26B is accommodated inside the front surface portion 26A1. However, a surface of a button 26B1 that is pressed by a user is exposed to the outside. As shown in FIGS. 11A and 11B, an inner wall surface of the front surface portion 26A1 includes a first inner wall surface 26A13 (an example of a "side wall") that faces a part of one side surface TR1 of the tape reel TR when the tape reel TR is mounted.

As shown in FIG. 1 and the like, a part of the front surface portion 26A1 excluding the central portion including the axis AX in which the holding unit 26B is accommodated is cut out. Therefore, openings are formed in the front surface portion 26A1. A size of an opening formed in the front surface portion 26A1 can be expressed by a maximum angle between one point on an opening edge of the front surface portion 26A1 and one point on the other opening edge sandwiching the opening, with the axis AX as a center in FIG. 10 when viewed from a direction facing the front surface portion 26A1 (a direction parallel to the axis AX of the bobbin case 26A). In the present embodiment, when viewed from the direction facing the front surface portion 26A1 (the direction parallel to the axis AX of the bobbin case 26A), an angle between a point 26A15 on an opening edge and a point 26A14 on the other opening edge with the axis AX as a center is about 120 degrees. Since such an opening is formed, when the tape reel TR is mounted, a part of the circular side surface of the tape reel TR is exposed to the outside.

In an outer surface of the back surface portion 26A2 (FIG. 2), a slit 26A21 is formed which communicates with the internal region for accommodating the tape reel TR and extends radially with respect to the axis AX from a position separated from the axis AX. As shown in FIGS. 11A and 11B, an inner wall surface of the back surface portion 26A2 includes a second inner wall surface 26A22 (an example of a "side wall") that faces a part of one circular side surface TR2 of the tape reel TR when the tape reel TR is mounted. Unlike the front surface portion 26A1, the back surface portion 26A2 is not cut out. Therefore, an area of the second inner wall surface 26A22 facing the other side surface of the tape reel TR is larger than an area of the first inner wall surface 26A13.

The circumferential portion 26A3 (FIG. 13) is a portion connecting the front surface portion 26A1 and the back surface portion 26A2. The circumferential portion 26A3 has a third inner wall surface 26A31 facing the surface of the outermost tape reel TR when the tape reel TR is mounted. The third inner wall surface 26A31 may include a cylindrical surface with the axis AX as a center following a shape of the outer peripheral surface of the tape reel TR. Further, at least a part of an outer surface may include a cylindrical surface with the axis AX as a center.

An opening for accommodating the tape reel TR therein is formed in the circumferential portion 26A3. Therefore, when viewed from the axis AX direction, the front surface portion 26A1 and the back surface portion 26A2 are not connected to each other by the circumferential portion 26A3 in all directions (360 degrees) about the axis AX, but only partially. In the present embodiment, when viewed from the direction facing the front surface portion 26A1 (the direction parallel to the axis AX of the bobbin case 26A), an angle between a point on an opening edge of the circumferential portion 26A3 and a point on the other opening edge sandwiching the opening with the axis AX as a center is about 120 degrees to about 180 degrees. As to be described later, an opening having a length larger than a diameter of the tape reel TR before use is formed in the circumferential portion 26A3, and thus the tape reel TR can be accommodated inside the bobbin case 26A by moving the tape reel TR in a direction perpendicular to the axis AX.

As shown in FIGS. 11A and 11B, the holding unit 26B includes the button 26B1 having a surface exposed to the outside so that the user can press; a shaft 26B2 (an example of a "first protrusion") which is held, on a back surface portion 26A2 side, together with the button 26B1 by engaging with the button 26B1 so as to be moveable back and forth in the axis AX direction, and which is rotatably held by a mechanism such as a bearing with the axis AX as a rotation axis; a male screw 26B3 that engages with the shaft 26B2 and the button 26B1 by screwing with a female screw formed on the button 26B1 and pressing the shaft 26B2 in a direction of the button 26B1; and a compression spring 26B4 which biases the shaft 26B2 in the axis AX negative direction (an axis AX direction toward the outer surface of the button 26B1). A washer 26B5 is inserted between a head portion of the male screw 26B3 and the button 26B1.

The surface of the button 26B1 is supported to be movable back and forth in the axis AX direction when being pressed by a user. A female screw having the axis AX as an axis and opening to an internal region side is formed in the button 26B1. The male screw 26B3 is screwed with the female screw. The button 26B1 and the shaft 26B2 are engaged so as to move integrally in the axis AX direction.

The shaft 26B2 has a cylindrical portion 26B21 formed in a cylindrical shape coaxial with the axis AX, and an engaging portion 26B22 that is formed to spread radially outward from a front end of the cylindrical portion 26B21 and that is formed axially symmetrical with respect to the axis AX. The engaging portion 26B22 includes a diameter-expanded portion 26B223 that is connected to the cylindrical portion 26B21 and extends radially outward from the cylindrical portion 26B21, an inclined surface portion 26B222 that is connected to the diameter-expanded portion 26B223 and that has an inclined surface that is inclined such that a distance from the axis AX increases as being away from the second inner wall surface 26A22, and a bottom surface portion 26B221 that is connected to the inclined surface portion 26B222 and protrudes in the axis AX negative direction. In the present embodiment, since the engaging portion 26B22 is formed axially symmetrical with respect to the axis AX, the inclined surface portion 26B222 is formed in a side surface of a truncated cone and the bottom surface portion 26B221 is formed in an annular shape. However, as to be described later, the bottom surface portion 26B221 does not necessarily have to be formed in an annular shape because it is sufficient for the bottom surface portion 26B221 to have a surface facing the axis AX negative direction in order to press and hold the film F.

A radius of the annular bottom surface portion 26B221 is smaller than an inner diameter of a winding core C of the tape reel TR to be described later and larger than a diameter of a hole formed in the film F. The shaft 26B2 is biased in the axis AX negative direction by the compression spring 26B4. Therefore, by pressing the film of the tape reel TR in a direction toward the first inner wall surface 26A13 by using the annular bottom surface portion 26B221, the tape reel TR can be supported rotatably around the axis AX.

A portion of the tape reel TR rather than the film F may be abutted with the bottom surface portion 26B221. For example, the tape reel TR may be supported rotatably around the axis AX by abutting a side surface of the winding core C facing the second inner wall surface 26A22 with the annular bottom surface portion 26B221.

Similarly, the tape reel TR can be held rotatably by using a component having a configuration rather than the shaft 26B2 and configured to be biased in a direction toward the first inner wall surface 26A13 when the component protrudes from the first inner wall surface 26A13.

Hereinafter, an example of a configuration of the tape reel TR that can be used in the binding machine 10 of the present embodiment will be briefly described.

As shown in FIG. 11B, the tape reel TR includes the cylindrical winding core C (an example of a "tubular bobbin") and the tape TP wound around the winding core C. For example, the film F is attached to one of the circular side surfaces of the tape TP that appears when both side portions of the tape TP are wound and stacked. An inner diameter of the film F is smaller than the inner diameter of the winding core C. Therefore, an inner diameter portion of the film F protrudes inward from the winding core C. A portion of the film F that protrudes inward from the winding core C is referred to as a rib R. An outer diameter of the film F is smaller than an outer diameter of the tape reel TR before use.

Therefore, one side surface of the tape reel TR has an inner peripheral side region to which the film F is attached, and an outer peripheral side region to which the film F is not attached and the side portions of the stacked tapes TP are exposed. However, the inner peripheral side region refers to a region on the side surface of the tape reel TR before use that is closer to the winding core C than to an outer periphery of the tape reel TR. The outer peripheral side region refers to a region on the side surface of the tape reel TR before use that is closer to the outer periphery of the tape reel TR than to the winding core C. Accordingly, when the tape reel TR is started to be used, the tape TP in the outer peripheral side region is initially used, and then the tape TP in the inner peripheral side region is used. A part of the film F may extend to the outer peripheral side region. On the contrary, the film F may be attached only to a part of the inner peripheral side region. In the present embodiment, the outer diameter of the film F is larger than a sum of a radius of the outer peripheral surface of the tape reel TR before use and the radius of the outer peripheral surface of the winding core C. Therefore, a part of the film F is attached to the entire inner peripheral side region and a part of the outer peripheral side region. Since the film F is not attached to the other side surface of the tape reel TR, a side portion of the tape TP is exposed over the entire side surface.

Next, a mounting method for mounting the tape reel TR to the tape magazine unit 26 will be described with reference to FIGS. 12A to 12D. FIGS. 12A to 12D are cross-sectional views of the bobbin case 26A of the tape magazine unit 26 taken along a cross section passing through the axis AX.

Figure 12A:
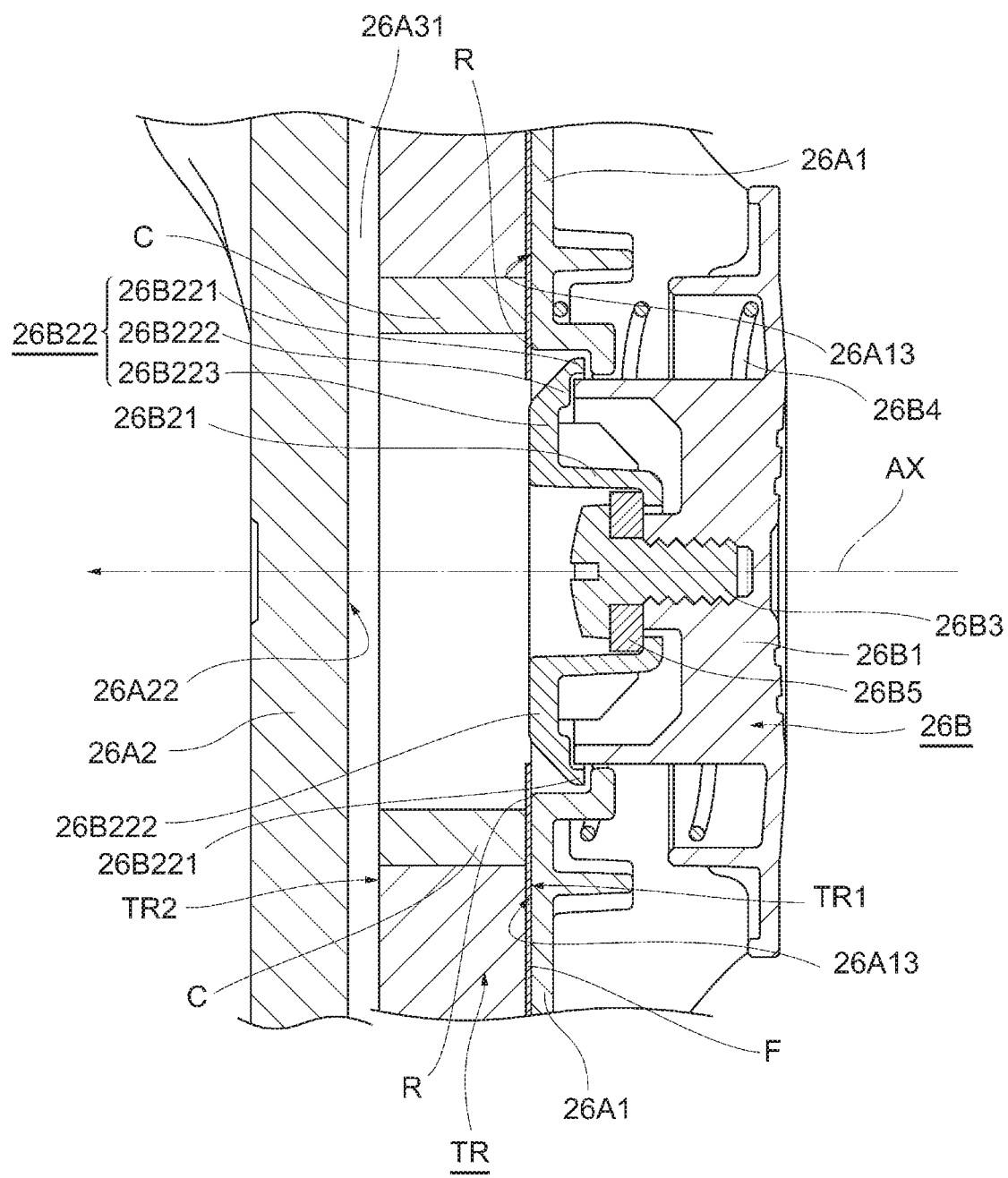
FIG. 12A is a cross-sectional view of the main part of the tape magazine unit before the tape reel is held.

First, the user opens the lid portion of the tape holder 28A (step S1). Next, the user moves the tape reel TR in a direction perpendicular to the axis AX of the bobbin case 26A, and accommodates the tape reel TR in the internal region of the bobbin case 26A through the opening formed in the circumferential portion 26A3 (step S2). For example, the user may accommodate the tape reel TR in the internal region of the bobbin case 26A by holding the binding machine 10 such that the main handle 20 stands vertically upward and the opening of the circumferential portion 26A3 faces vertically upward, and moving the tape reel TR vertically downward. When the tape reel TR is accommodated in the bobbin case 26A, it is preferable that the axis AX exists in a region surrounded by the winding core C of the tape reel TR, as shown in FIG. 12A. For example, the third inner wall surface 26A31 is formed to include a cylindrical surface that is separated from the axis AX by a distance slightly larger than the outer diameter of the tape reel TR before use, and therefore, when the tape reel TR is accommodated, the axis AX of the bobbin case 26A and a central axis of the tape reel TR can be configured to approach each other within a predetermined distance.

Figure 12B:
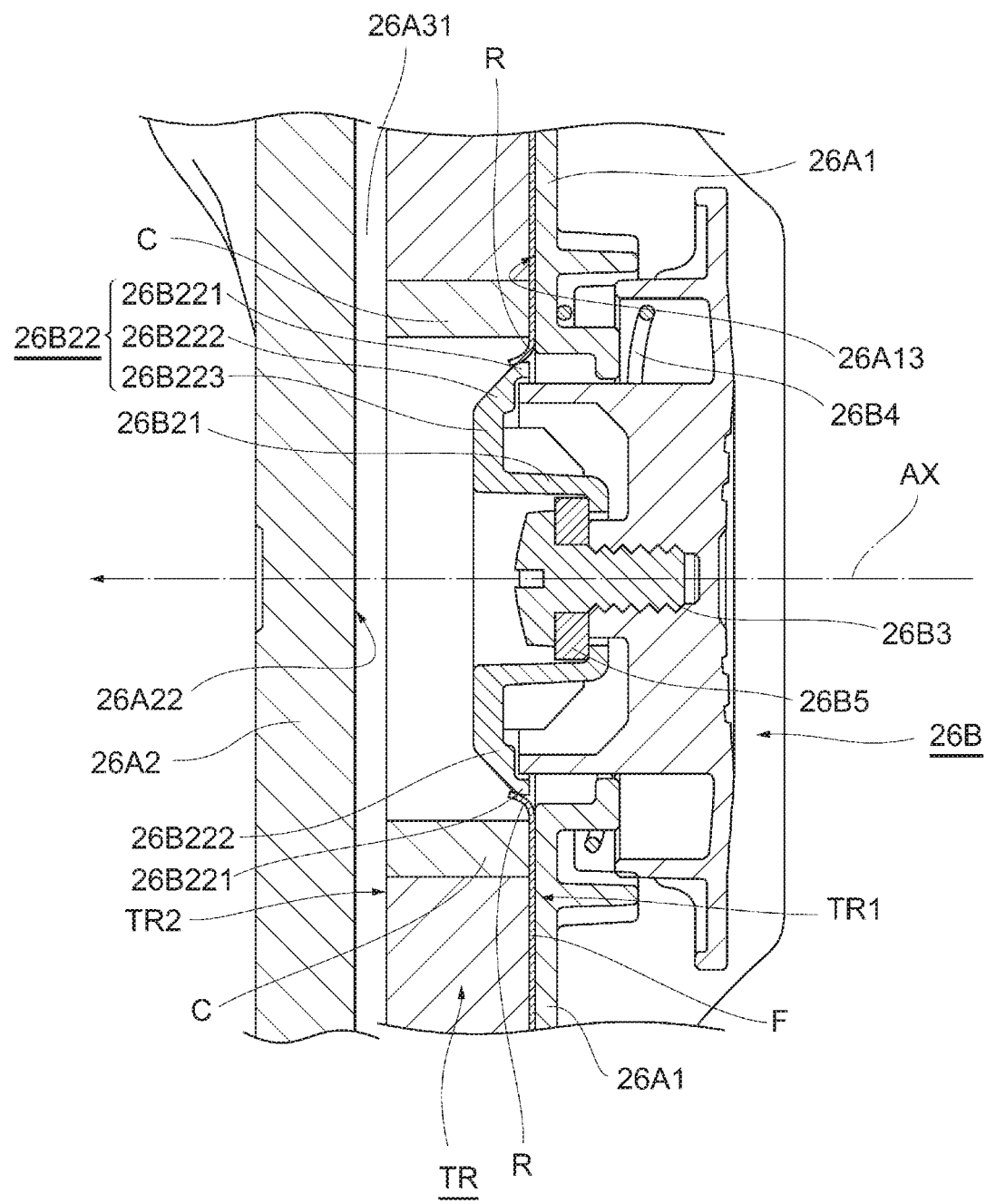
FIG. 12B is a cross-sectional view of the main part of the tape magazine unit in a state where a shaft moving in an axial direction is abutted with a film.

Next, the user presses the button 26B1 (step S3). Accordingly, as shown in FIG. 12B, the button 26B1 and the shaft 26B2 advance in the axis AX positive direction. Therefore, a part of the shaft 26B2 protrudes from the first inner wall surface 26A13 and enters the internal region of the bobbin case 26A. At this time, since an outer diameter of the bottom surface portion 26B221 (twice of the distance between the bottom surface portion 26B221 and the axis AX) is formed to be larger than the inner diameter of the hole of the film F, the inclined surface of the inclined surface portion 26B222 contacts the rib R of the film F. However, since being a free end, an end portion of the rib R elastically deforms following the inclined surface of the inclined surface portion 26B222 as shown in FIG. 12B.

Figure 12C:
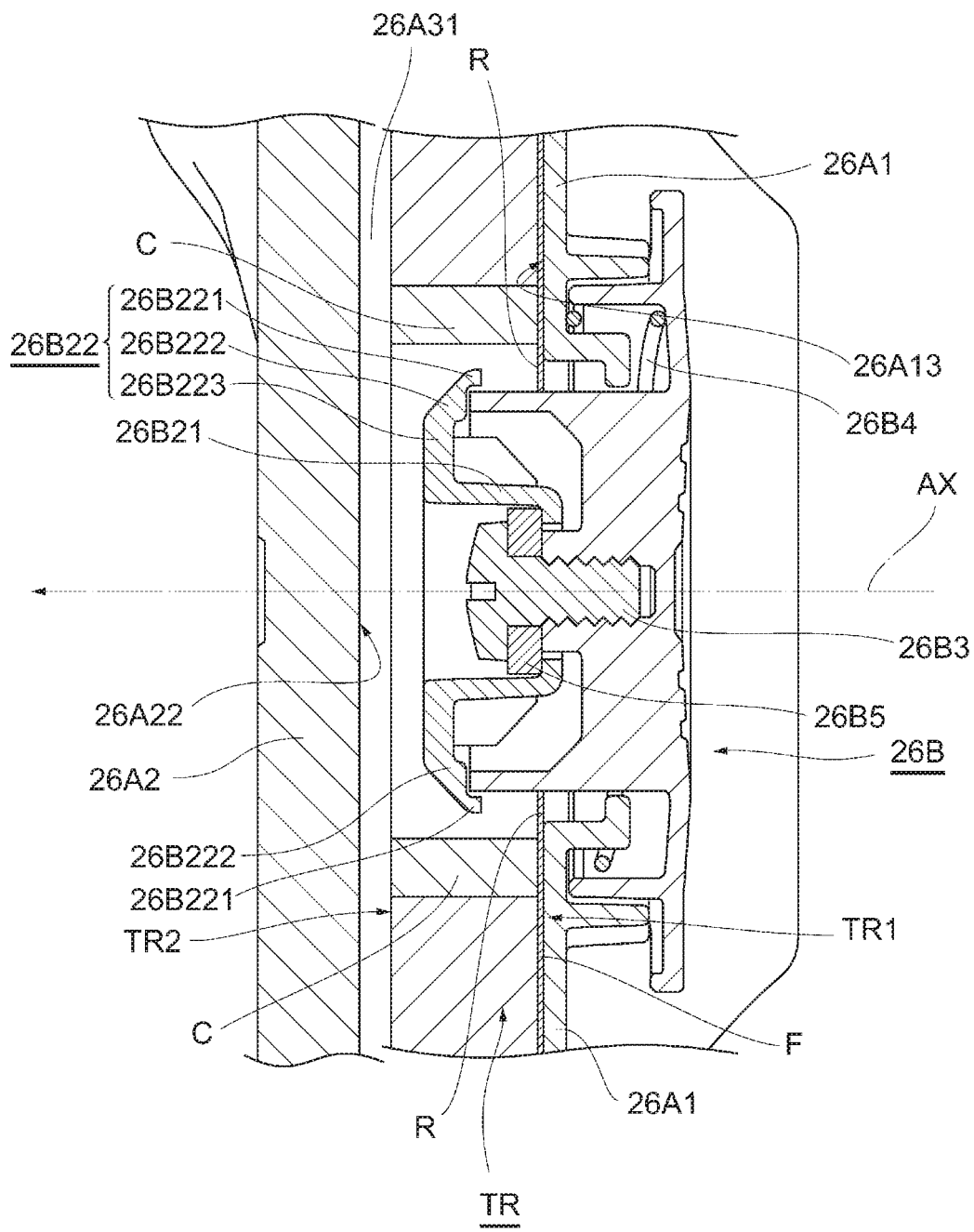
FIG. 12C is a cross-sectional view of the main part of the tape magazine unit in a state where a shaft moving in the axial direction passes through the film.

When the button 26B1 and the shaft 26B2 are further moved in the axis AX positive direction, the bottom surface portion 26B221 of the engaging portion 26B22 passes through the rib R of the film F (step S4). Therefore, as shown in FIG. 12C, the engaging portion 26B22 exists in a region surrounded by the rib R and an inner wall surface of the winding core C.

Figure 12D:
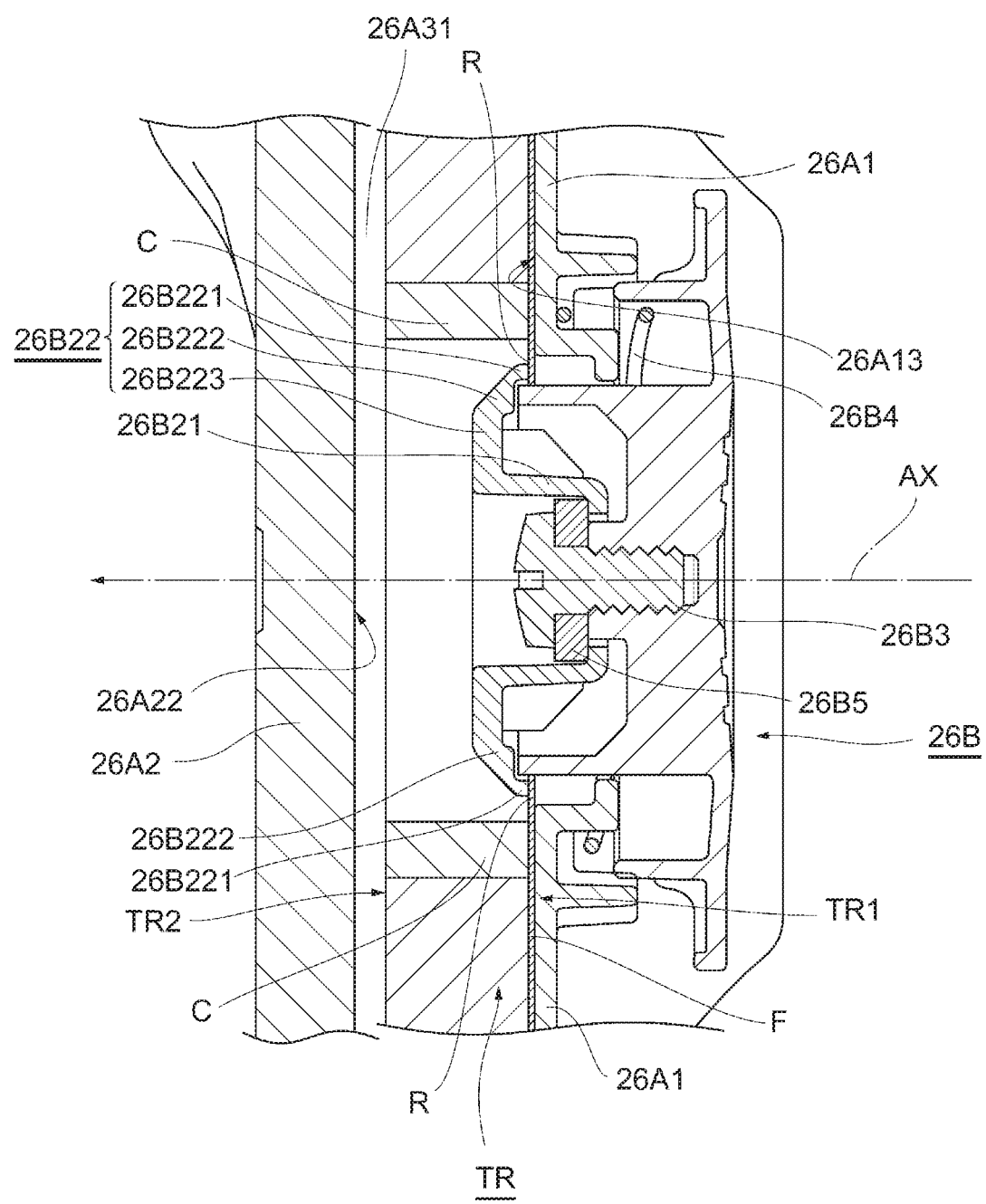
FIG. 12D is a cross-sectional view of the main part of the tape magazine unit in a state where a bottom surface portion of the shaft is abutted with the film and holds the tape reel.

Thereafter, when pressing of the button 26B1 is stopped, the button 26B1 and the shaft 26B2 are moved in the axis AX negative direction, which is an opposite direction, due to the biasing force of the compression spring 26B4. However, the bottom surface portion 26B221 of the engaging portion 26B22 contacts and presses an edge portion of the rib R (an example of "engagement" or "fitting") (step S5). Therefore, as shown in FIG. 12D, the tape reel TR can be rotatably held while maintaining a state where the engaging portion 26B22 is accommodated in the region surrounded by the rib R and the inner wall surface of the winding core C. At this time, a surface of the film F and the first inner wall surface 26A13 may face each other and partially contact each other. However, by forming the film F with a member having high smoothness, the rotation of the tape reel TR can be prevented from being unnecessarily hindered. By increasing the biasing force of the compression spring 26B4, the tape reel TR can be pressed and held with a stronger force while deforming the end portion of the rib R in a direction away from the winding core C. The rigidity of the film F, the elastic force of the compression spring 26B4, the thickness of the film F, and the like can be appropriately designed by a person skilled in the art.

Thereafter, the user pulls out the front end of the tape TP to pass the inside of the tape holder 28A, causes the tape guide 28B to hold the front end portion of the tape TP, and then closes the lid portion of the tape holder 28A (step S6).

By executing the above process, the mounting of the tape reel TR to the binding machine 10 is completed. The user can use the binding machine 10 to repeatedly perform the gripping operation and the binding operation. Since the engagement between the shaft 26B2 and the film F is released by pulling the button 26B1 in the axis AX negative direction, the tape reel TR can be easily removed.

According to the tape magazine unit 26 having the above configuration, since the opening through which the tape reel TR can pass is formed in the circumferential portion 26A3 of the bobbin case 26A, the tape reel TR can be accommodated in the bobbin case 26A. Therefore, the tape reel TR can be set in the bobbin case 26A more easily than in the related art. Since the tape reel TR can be set in the bobbin case 26A without changing a manner of holding the binding machine 10, the possibility that the tape reel TR drops during setting can be reduced.

As will be understood by a person skilled in the art, the tape magazine unit 26 and the bobbin case 26A can be used in a binding machine for implementing a binding method rather than the binding machine 10.

Since not only the circumferential portion 26A3 but also a part of the front surface portion 26A1 is cut out to form the opening, a center of the tape reel TR and a center of the bobbin case 26A can be easily aligned even for a tape reel TR that has been used up. In particular, one or a plurality of circular ribs 26A11 centering on the axis AX are formed on the front surface portion 26A1. Therefore, by comparing the rib 26A11 with a boundary between the tapes TP on the side surface of the tape reel TR that can be observed from the opening or the outer diameter of the film F, the alignment can be easily performed. As shown in FIG. 10, the small-diameter hole 26A12 is formed in the region on the rear side of the front surface portion 26A1. Therefore, by confirming the positions of the tape reel TR and the film F observed through the hole 26A12 together with the side surface of the tape reel TR observed through the opening, the alignment can be performed more easily.

Even if the tape TP is pulled out too much, the user can directly rotate the tape reel TR in the reverse direction from the opening provided in the front surface portion 26A1.

Since the surface of the button 26B1 is exposed to the outside, even a user who is not accustomed to using the binding machine can easily understand the work for setting the tape reel TR.

The slit 26A21 extending radially is formed in the back surface portion 26A2 (FIG. 2). Therefore, the tape remaining amount of the tape reel TR can be easily grasped. Further, information indicating the tape remaining amount may be printed in a vicinity of the slit 26A21. For example, on a surface of the back surface portion 26A2, "100%" may be printed in a vicinity of a region on an outer diameter side of the slit 26A21, "10%" may be printed in a vicinity of a region on an inner diameter side, and "50%" may be printed in a vicinity of a region between the above two regions.

In the present embodiment, the shaft 26B2 is configured to press the rib R of the film F of the tape reel TR. Therefore, even for tape reels TR with winding cores C having different inner diameters, by making the inner diameter of the film F uniform, the tape reel TR to which such a film F is attached can be held.

However, a tape reel to which the film is not attached can also be held. For example, the bottom surface portion 26B221 of the shaft 26B2 may be configured to press a side surface of the winding core C instead of the rib R of the film F. With such a structure, a tape reel without a film can also be held. By expanding a size of the bottom surface portion 26B221 in the radial direction, the bottom surface portion 26B221 can also press winding cores having different inner diameters. The tape reel may be held by pressing the inner diameter surface of the winding core radially outward.

Brake Unit

Figure 13:
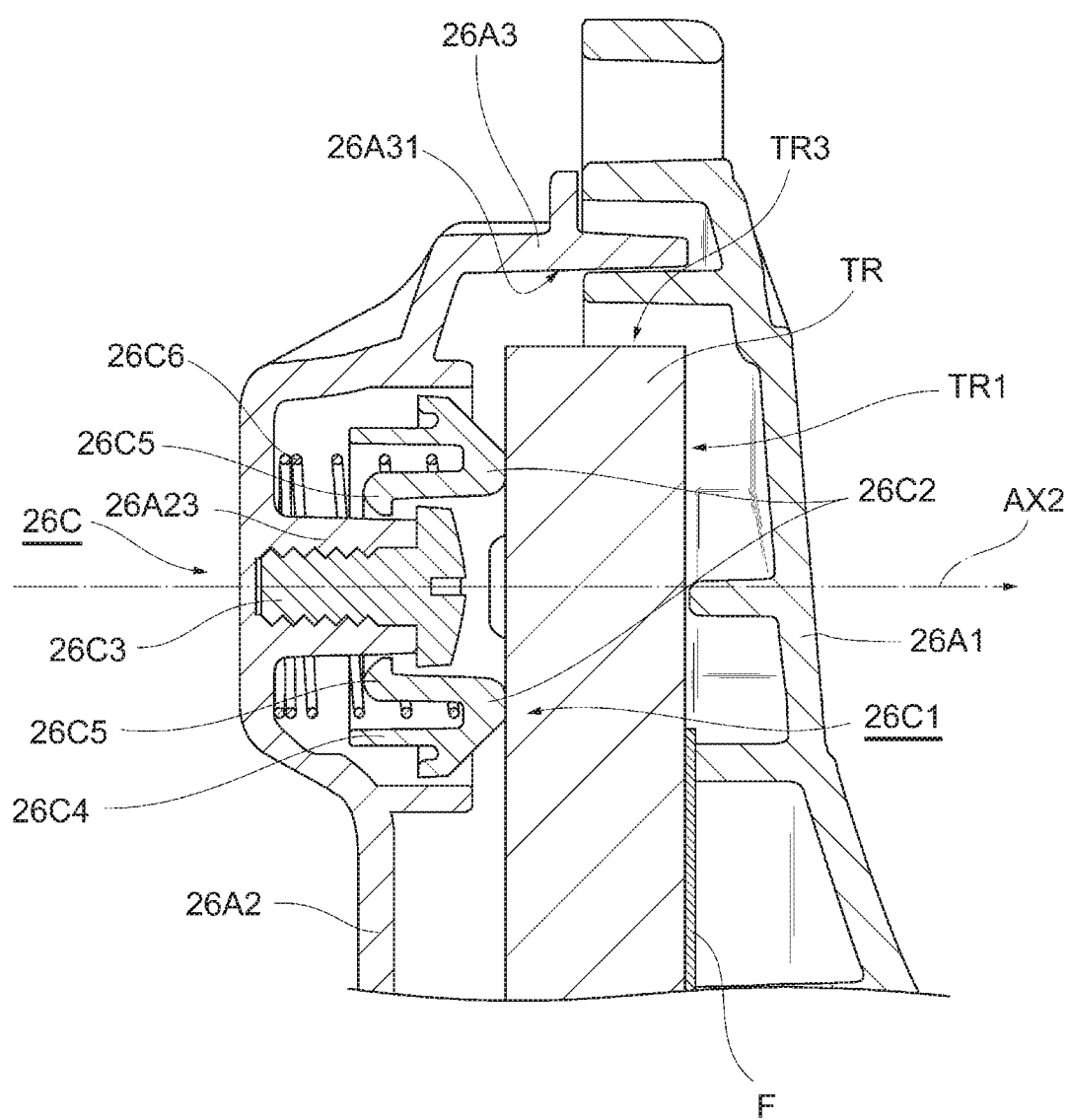
FIG. 13 is a cross-sectional view of a main part of a brake unit.
Figure 14:
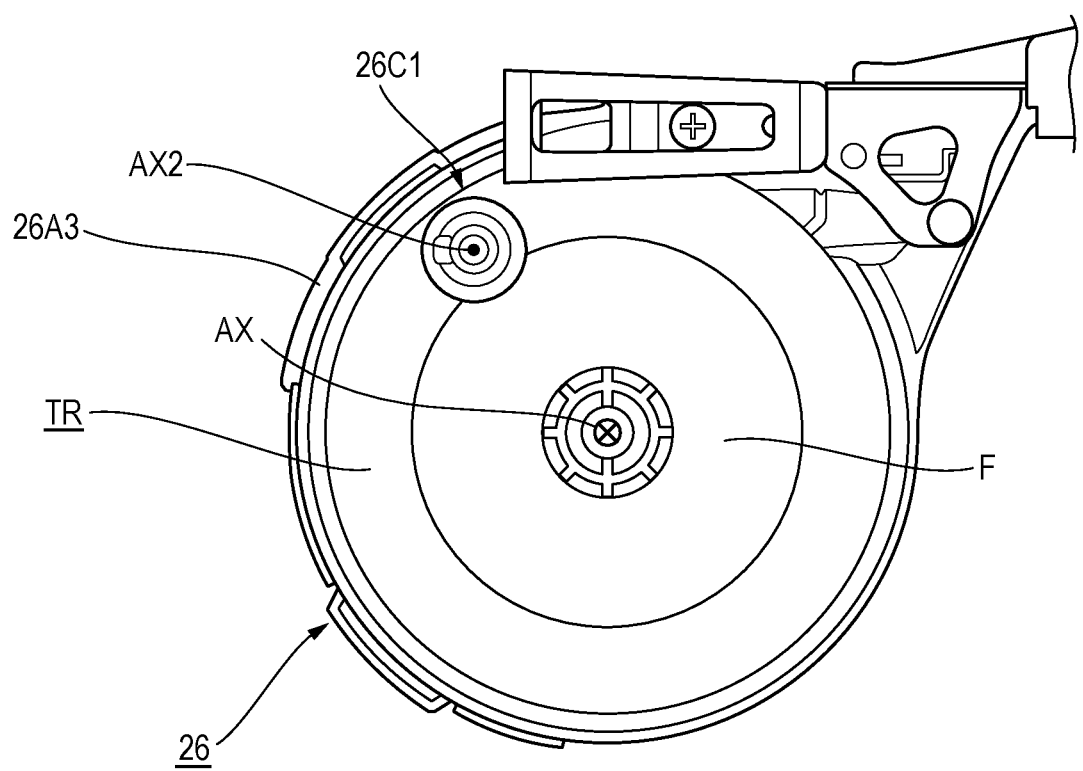
FIG. 14 is a perspective view of the tape magazine unit showing a brake pad.

Hereinafter, a brake unit 26C (an example of a "second protrusion") that can be mounted on the tape magazine unit 26 will be described. FIG. 13 is a cross-sectional view of a main part of the tape magazine unit 26 along a cross section passing through an axis AX2 that is a center of the brake unit 26C. FIG. 14 is a perspective view of the tape magazine unit 26 in FIG. 1 showing a brake pad 26C1 (an example of an "abutting member") of the brake unit 26C.

As shown in FIG. 13, the brake unit 26C is attached to the back surface portion 26A2. The brake unit 26C includes a brake pad 26C1 that presses the side surface of the tape reel TR in the axis AX direction, a compression spring 26C6 (an example of an "elastic member") that applies, to the brake pad 26C1, a biasing force for pressing the side surface of the tape reel TR, and a male screw 26C3 for preventing the brake pad 26C1 from coming off from the back surface portion 26A2.

The brake pad 26C1 is preferably made of a material having elasticity and wear resistance, and can be made of, for example, PA (polyamide), PP (prepropylene), POM (polyacetal) or the like. The brake pad 26C1 is formed symmetrically with respect to the axis AX2. Further, the brake pad 26C1 has a projection portion 26C2 protruding in an axis AX2 direction. As shown in FIG. 14, when viewed from the axis AX2 direction, the projection portion 26C2 is formed in a circular shape. The brake pad 26C1 includes an inner wall portion 26C5 that is connected to an inner diameter side of the projection portion 26C2 and extends in a direction retracting from the projection portion 26C2 in the axis AX2 direction, and an outer wall portion 26C4 that is connected to an outer diameter side of the projection portion 26C2 and extends in a direction retracting from the projection portion 26C2 in the axis AX2 direction. A region surrounded by the projection portion 26C2, the inner wall portion 26C5, and the outer wall portion 26C4 forms a cylindrical portion or space. As shown in FIG. 13, an end portion of the inner wall portion 26C5 bends radially inward toward the axis AX2.

The back surface portion 26A2 is provided with a support portion 26A23 for attaching the brake pad 26C1. The support portion 26A23 is formed in a cylindrical shape with the axis AX2 as an axis. By disposing the brake pad 26C1 such that the end portion of the inner wall portion 26C5 of the brake pad 26C1 abuts with a cylindrical surface of the support portion 26A23, the brake pad 26C1 can be provided at a desired position.

The compression spring 26C6 presses the brake pad 26C1 from the back surface portion 26A2 to the front surface portion 26A1. The compression spring 26C6 is inserted into a cylindrical portion or space surrounded by the inner wall portion 26C5 and the outer wall portion 26C4. Therefore, the compression spring 26C6 can press a portion close to the projection portion 26C2. The brake pad 26C1 can be pressed in a direction almost parallel to the axis AX2 direction.

A female screw with the shaft AX2 as an axis is formed on the support portion 26A23 formed in a cylindrical shape. The male screw 26C3 is screwed with the female screw. A head portion of the male screw 26C3 protrudes from the support portion 26A23. Since the end portion of the inner wall portion 26C5 of the brake pad 26C1 is caught by a protruding portion, the brake pad 26C1 can be prevented from coming off from the back surface portion 26A2. Since the brake pad 26C1 presses the side surface of the tape reel TR that is to be rotated, the brake pad 26C1 may be twisted or tilted as the tape reel TR rotates, but by providing the above-mentioned configuration, the brake pad 26C1 can be prevented from coming off from the back surface portion 26A2. The side surface of the tape reel TR is not necessarily formed in one plane and may have fine irregularities. However, by forming the brake pad 26C1 with an elastic material, the brake pad 26C1 can elastically press the side surface of the tape reel TR even when the side surface has irregularities.

As shown in FIG. 14, in the present embodiment, the projection portion 26C2 of the brake pad 26C1 is provided to be located in the outer peripheral side region of the side surface of the tape reel TR. The projection portion 26C2 of the brake pad 26C1 is provided to be located in a region on the outer diameter side of the film F.

According to the binding machine 10 including the brake unit 26C as described above, the brake pad 26C1 contacts the side surface of the tape reel TR. Therefore, the tape reel TR can be prevented from excessively rotating due to a frictional force.

Since the brake pad 26C1 elastically presses the side surface of the tape reel TR, even when the side surface has irregularities, the brake pad 26C1 can press the side surface of the tape reel TR and apply braking by the frictional force.

The brake unit 26C is provided to be movable back and forth in the axis AX2 direction due to the compression spring 26C6. Therefore, the brake unit 26C does not prevent the tape reel TR from being mounted. Further, even when a distance between the side surface of the tape reel TR and the brake pad 26C1 changes to some extent as the tape reel TR rotates, the brake unit 26C can press the side surface of the tape reel TR and apply braking by the frictional force.

By adopting the compression spring 26C6, a vertical load with little fluctuation can be applied, the braking force can be stabilized.

Since the brake pad 26C1 presses the outer peripheral side region of the side surface of the tape reel TR, the tape TP that is excessively pulled out due to the large remaining amount of tape can be prevented from jumping out of the tape magazine unit 26. When the tape remaining amount is small, the tape TP exists only in the inner peripheral side region. Therefore, the brake pad 26C1 does not press the side surface of the tape reel TR. However, when the tape remaining amount is small, the tape TP that is excessively pulled out from the tape magazine unit 26 is less likely to jump out. Since the film F is attached to the other side surface of the tape reel TR, the tape TP can be prevented from being excessively pulled out due to the film F. However, a tape reel that does not have the film F can be applied to the present invention. The brake pad may be configured to press the inner peripheral side region of the side surface of the tape reel TR.

Further, by providing the brake pad 26C1, fluctuation of the pull-out resistance of the tape TP can be prevented. That is, when the tape remaining amount is large, the pull-out resistance is relatively small because a distance between the axis AX, which is a rotation center of the tape reel TR, and the tape TP that is pulled out is large and a moment is large. On the other hand, when the tape remaining amount is small, the pull-out resistance is relatively large because the distance between the axis AX, which is the rotation center of the tape reel TR, and the tape TP that is pulled out is small and the moment is small. As shown in the present embodiment, a means for pressing the outer peripheral side region (or a position on an outer peripheral side region side even if the inner peripheral side region is pressed) on the side surface of the tape reel TR is provided, and thus the pull-out resistance when the tape TP on the outer diameter side of the pressed position is pulled out can be increased. Therefore, a variation amount with the pull-out resistance when the tape TP on the inner diameter side of the pressed position is pulled out can be prevented. As a result, a work load on the user can be reduced. Further, since the fluctuation of the pull-out resistance is reduced, the degree of freedom in designing the binding machine is also improved.

The brake unit 26C according to the present embodiment can be widely applied to a binding machine that uses a rotating tape reel. The brake unit 26C can be applied to a binding machine and a tape reel rather than the binding machine 10 and the tape reel TR according to the present embodiment. In the present embodiment, an example in which the brake unit 26C is configured with the brake pad 26C1 and the compression spring 26C6 is shown as an example of the second protrusion, but the present invention is not limited to this combination. For example, the compression spring 26C6 may be eliminated and the elasticity of the brake pad 26C1 may be used to abut the brake pad 26C1 with the side surface of the tape reel TR, and the brake pad 26C1 itself may function as both the abutting member and the elastic member.

Operation of Binding Machine 10

Figure 4:
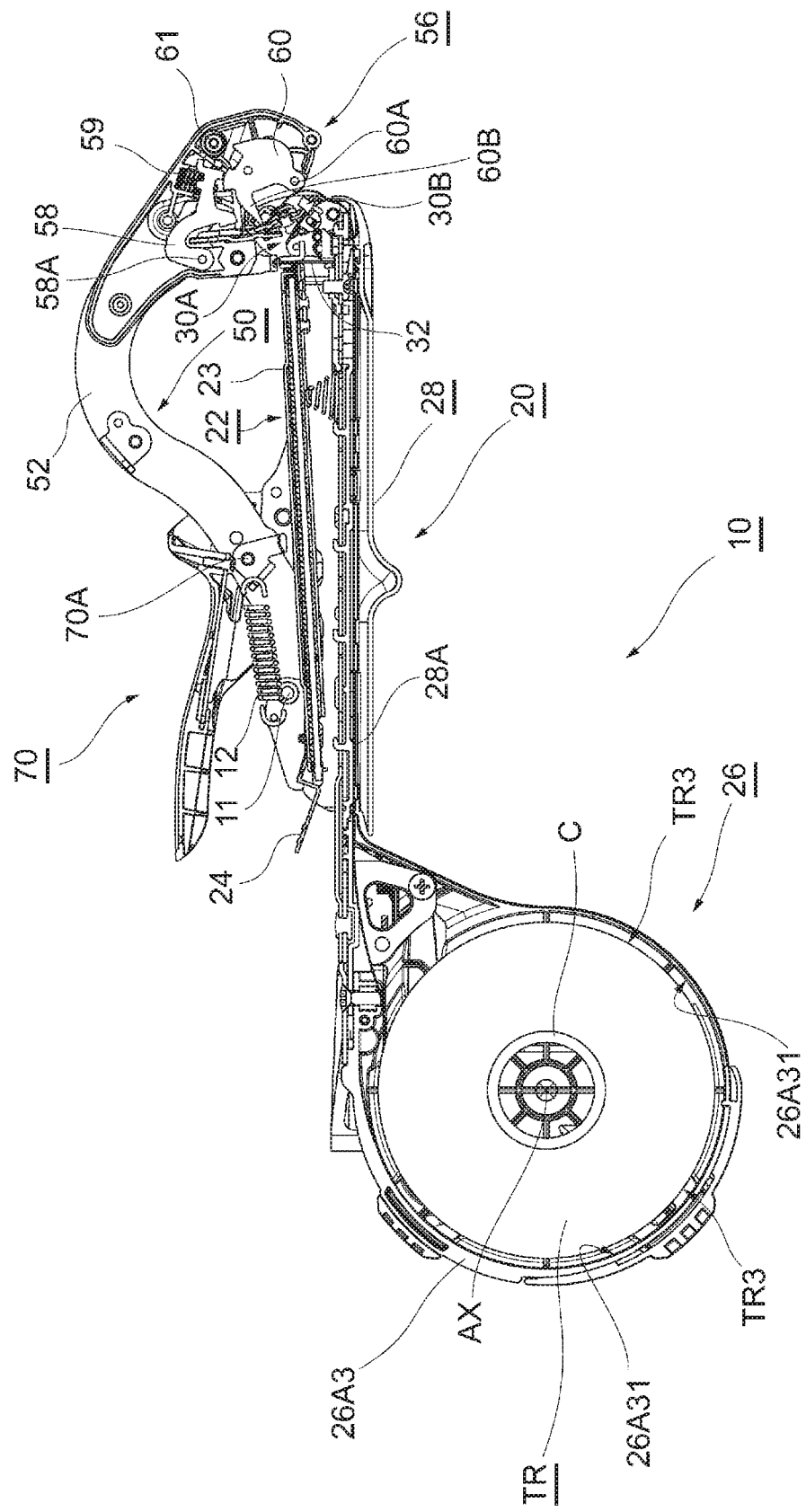
FIG. 4 is a cross-sectional view of the binding machine in a state where tape is gripped.

The clincher arm 50 is constantly biased by the tension spring 12, and in a standby state shown in FIGS. 1 to 3, the clincher arm 50 is in an open state with respect to the main handle 20. When a user grips the operation handle 70 and the main handle 20 in the open state, as shown in FIG. 4, the clincher arm 50 rotates in a closing direction with respect to the main handle 20. Then, when the clincher arm 50 is rotated in the closing direction to a predetermined position with respect to the main handle 20, in order to pull out the tape TP (FIG. 5), the gripping operation of gripping the tape TP by the tape gripping unit 56 of the clincher arm 50 is executed.

Figure 5:
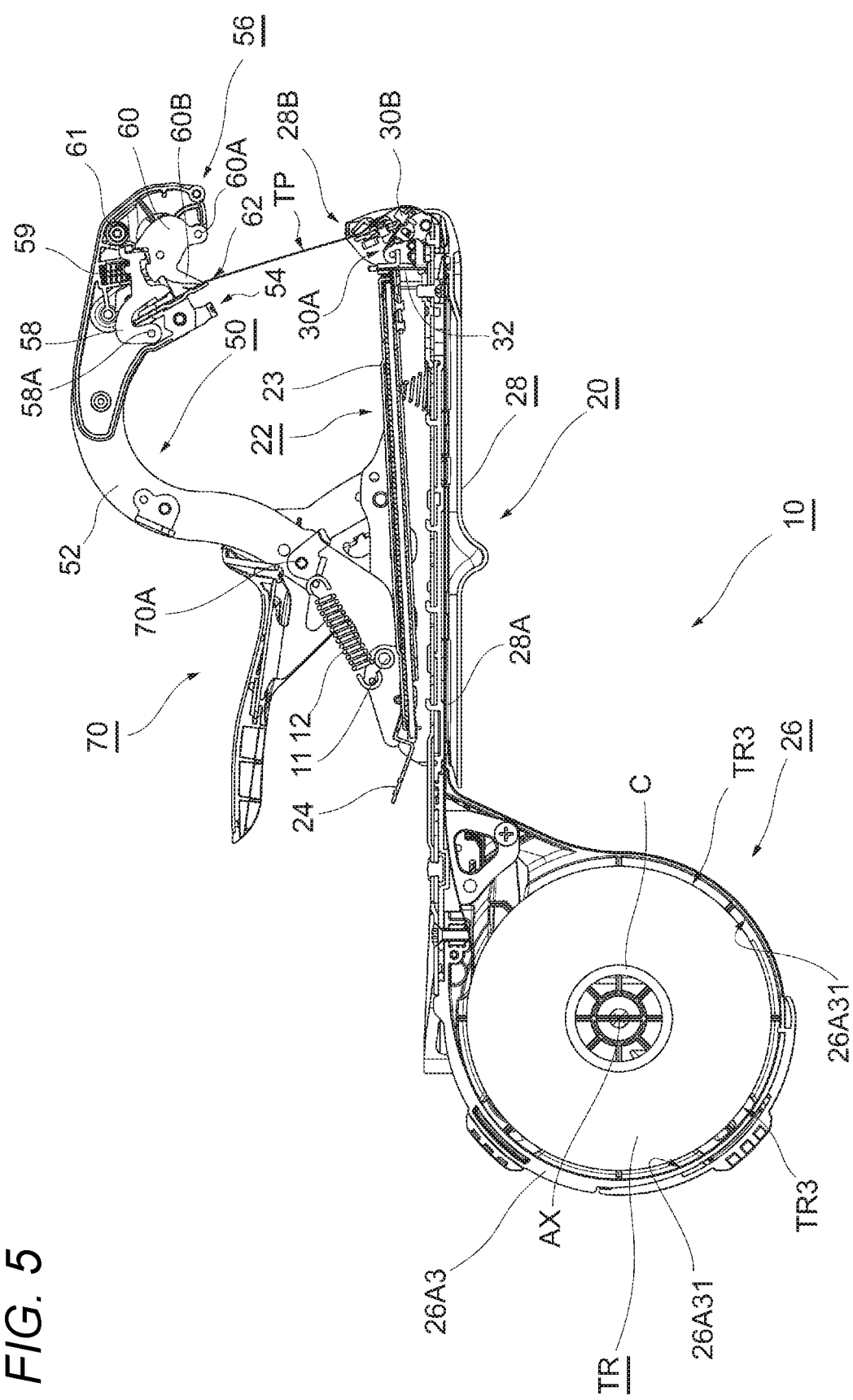
FIG. 5 is a cross-sectional view of the binding machine in a state where the tape is pulled out.

Thereafter, when the gripping of the main handle 20 is weakened and the clincher arm 50 is rotated in the opening direction with respect to the main handle 20, as shown in FIG. 5, the tape gripping unit 56 of the clincher arm 50 and the tape guide 28B of the main handle 20 are separated from each other in a state where the tape TP is held, and the tape TP is stretched between the clincher arm 50 and the main handle 20. As the clincher arm 50 is rotated in the opening direction, the tape reel TR rotates in a positive direction around the axis AX2. At this time, since the brake pad 26C1 presses the side surface of the tape reel TR, a frictional force that prevents the rotation is generated. Therefore, even in a case where the tape reel TR rotates forward at high speed due to that the user suddenly weakens the gripping of the main handle 20, the tape reel TR can be prevented from excessively rotating. Further, even in a case where a rotation axis of the tape reel TR tilts and the position in the axis AX direction changes due to that the tape reel TR is biased by the compression spring 26B4, the brake pad 26C1 can press the side surface of the tape reel TR.

Figure 6:
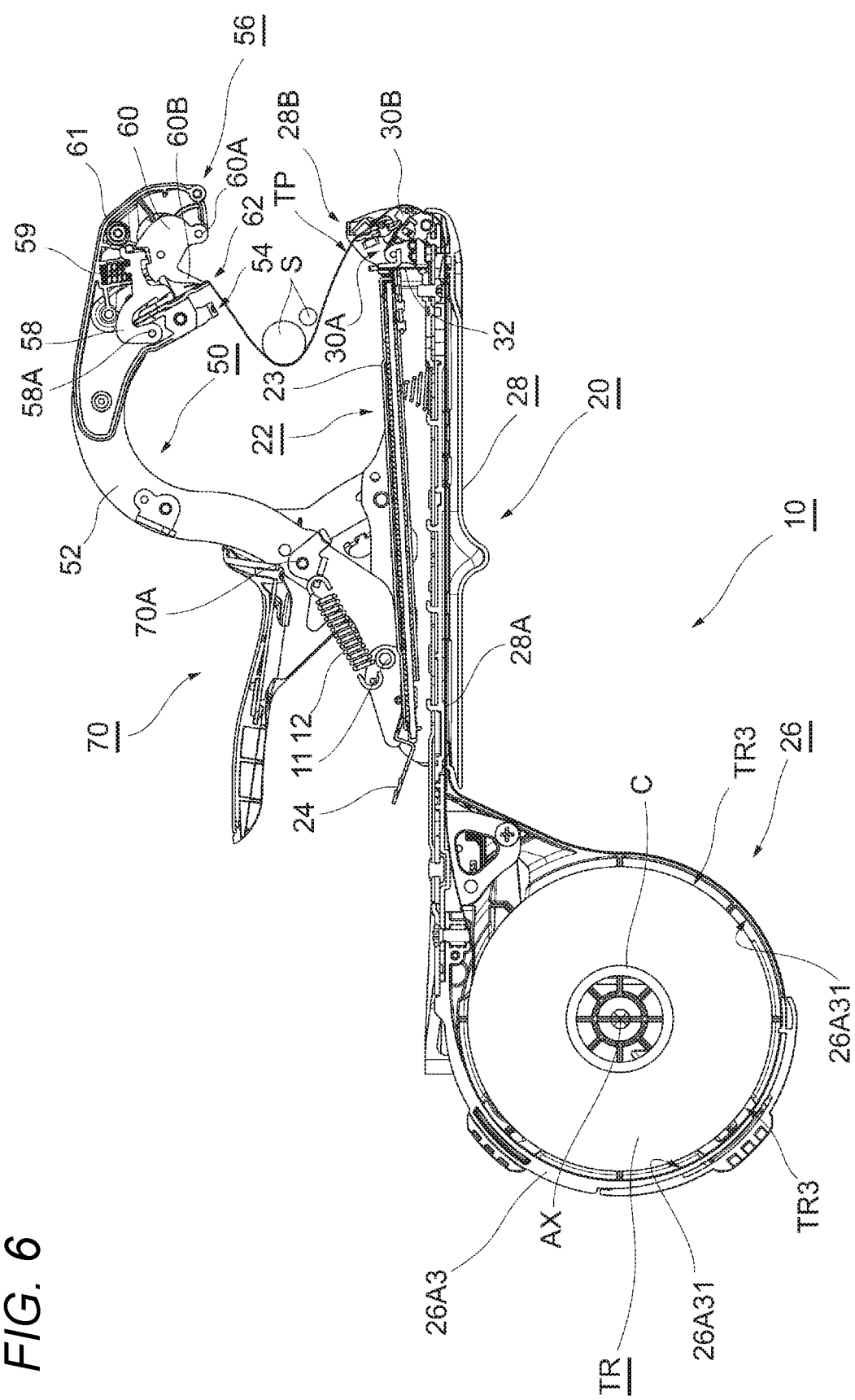
FIG. 6 is a cross-sectional view of the binding machine with in a state where a binding object is inserted.
Figure 7:
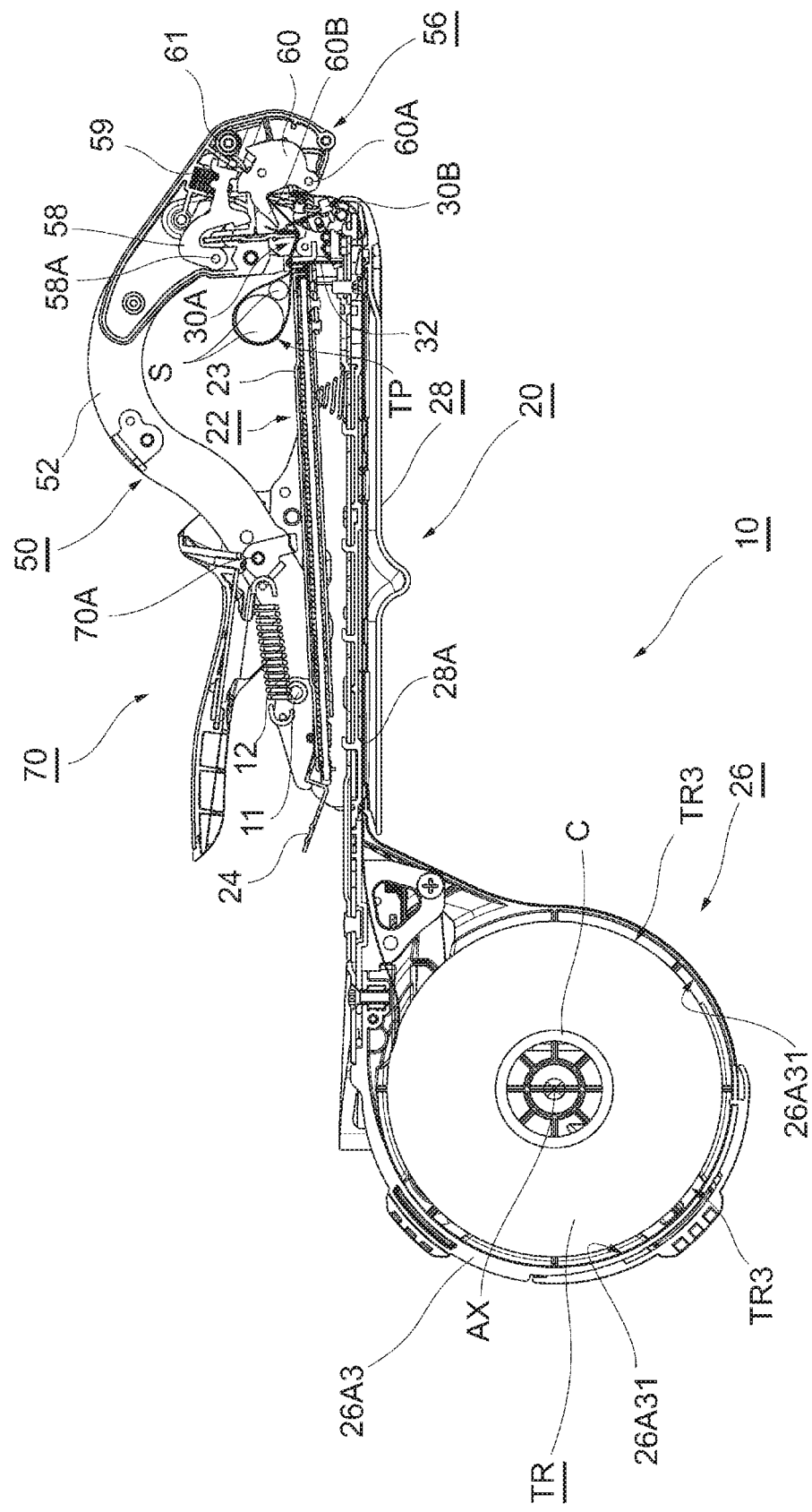
FIG. 7 is a cross-sectional view of the binding machine in a state where striking of a staple is started.
Figure 8:
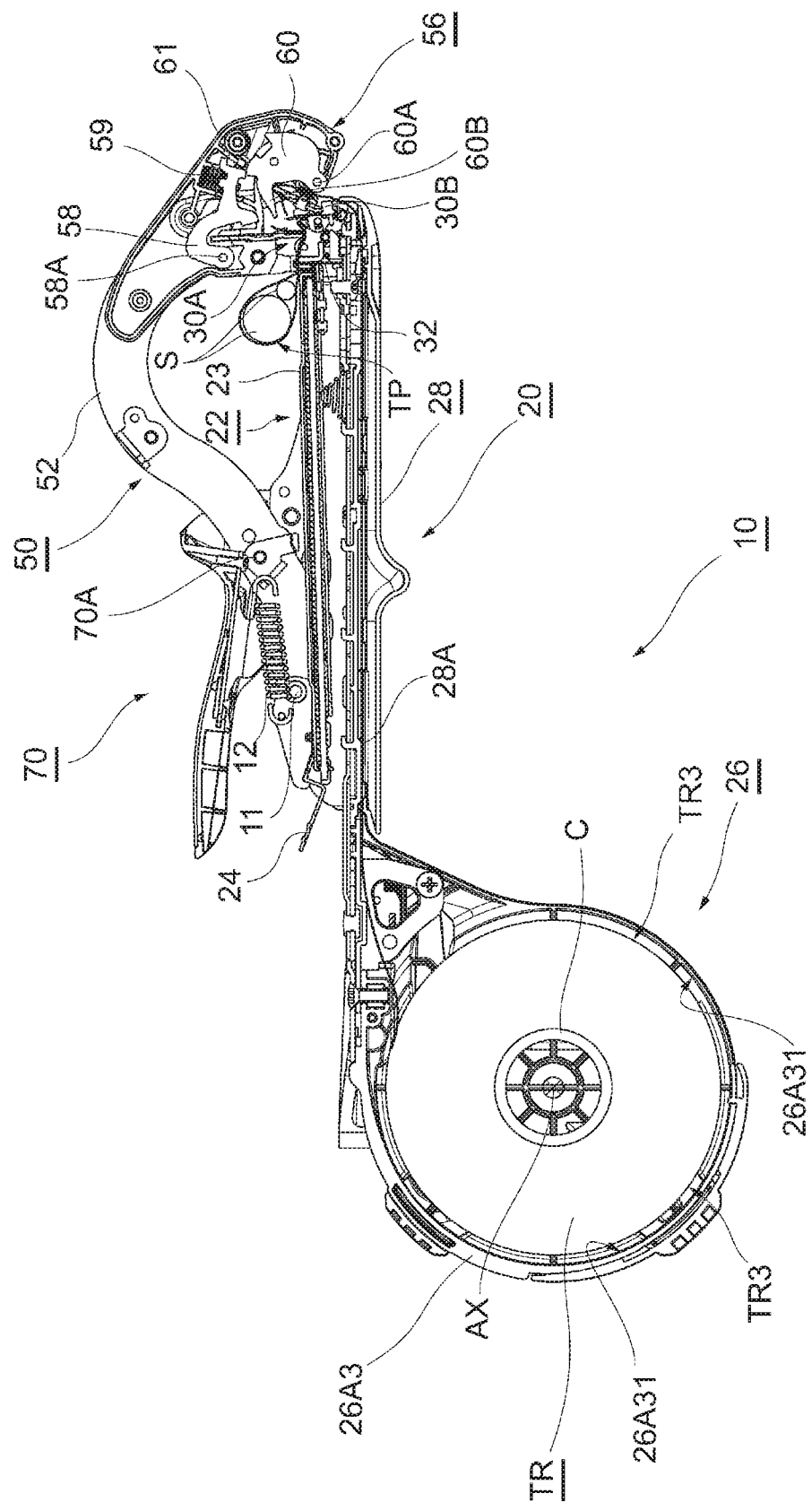
FIG. 8 is a cross-sectional view of the binding machine in a state where the staple is being struck.
Figure 9:
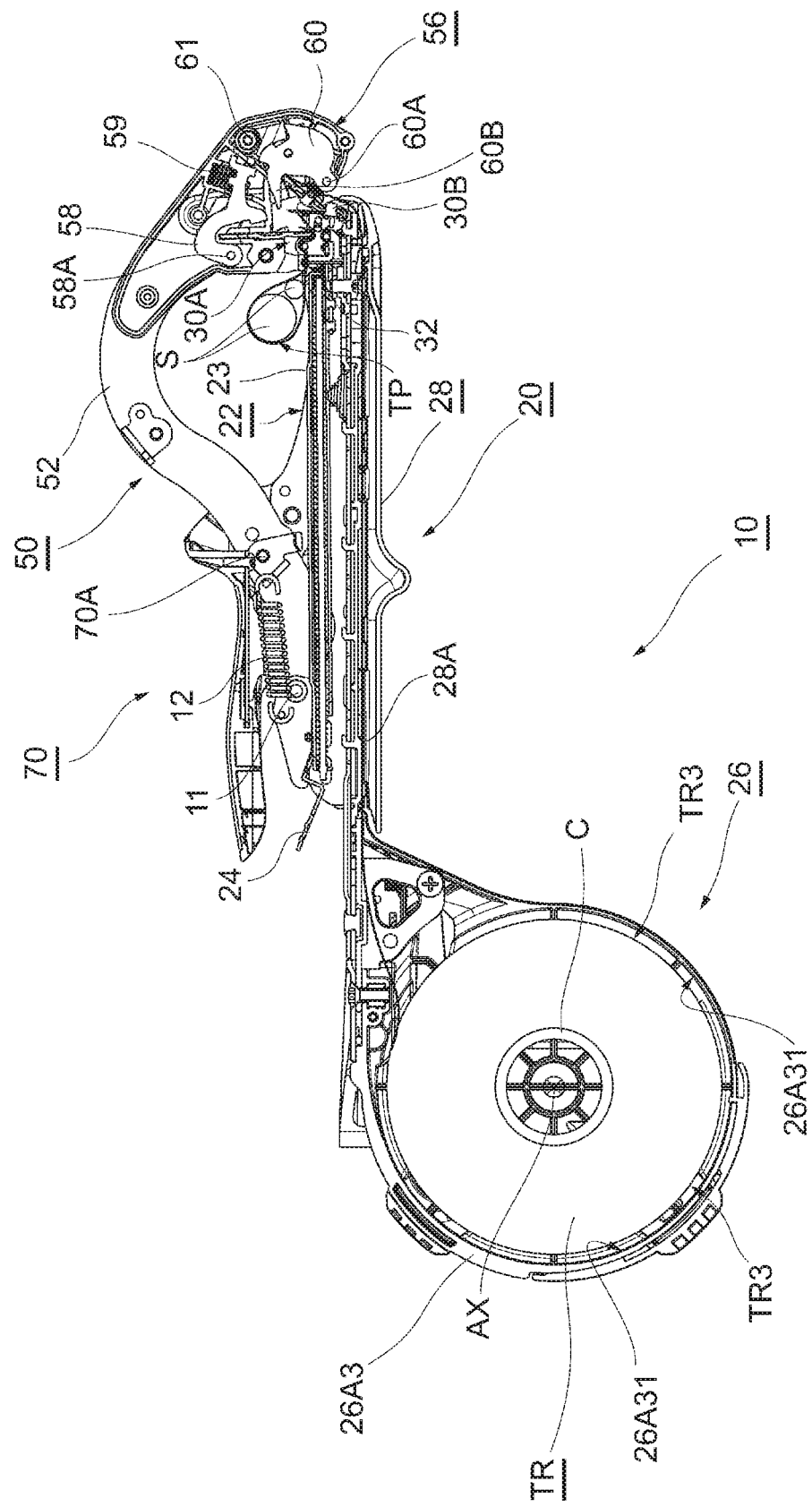
FIG. 9 is a cross-sectional view of the binding machine in a state where striking of the staple is completed.

As shown in FIG. 6, when the binding object S such as a seedling or a branch is put in from the outside of the tape TP stretched in this state and the clincher arm 50 is rotated again in the closing direction, as shown in FIG. 7, a tape loop of the tape TP that binds the binding object S is formed. Since the staple magazine unit 22 is pressed by the clincher arm 50 and rotates in the closing direction, the staple driver 32 strikes the staple ST. Therefore, as shown in FIGS. 8 and 9, both ends of the tape loop that binds the binding object S are bound by staple ST. The tape TP is cut by the cutting blade 30A, and the binding operation is executed.

In this way, the gripping operation is performed in a first gripping operation, and the binding operation is performed in a second gripping operation. Then, the binding object S can be bonded by alternately performing a gripping operation and a binding operation. In the present embodiment, although the staple ST is used as a means for binding both ends of a tape loop, the present invention is not limited thereto, and the tape loop may be bound by another means.

As described above, according to the binding machine 10 of the present embodiment, excessive normal rotation of a wound binding tape can be prevented during pulling out of the binding tape along with a gripping operation or a binding operation.

The present invention can be variously modified without departing from the gist thereof. For example, a part of the components in one embodiment may be added to another embodiment within the ordinary creativity of a person skilled in the art. Further, a part of the components in a certain embodiment can be replaced with corresponding components in another embodiment.

According to an aspect of the invention, a binding machine, includes: an accommodating portion configured to accommodate a tape reel, which has a tubular bobbin and a tape wound around an outer circumferential surface of the bobbin, with a part of the tape pulled out of the accommodating portion; a main handle configured to hold the tape pulled out from the accommodating portion; and a clincher arm attached to the main handle rotatably in a first direction toward the main handle and a second direction away from the main handle, and configured to grip the tape held by the main handle by rotating in the first direction and further pull out the tape by rotating in the second direction after the gripping. The accommodating portion includes: a side wall configured to face a side surface of the accommodated tape reel, a first protrusion protruding from the side wall and configured to fit to the bobbin of the accommodated tape reel so as to rotatably support the tape reel, and a second protrusion protruding from the side wall and configured to abut with a side surface of the accommodated tape reel.

The second protrusion may be configured to abut with an outer peripheral side region of the side surface of the tape reel. The second protrusion may include: an abutting member configured to abut with the side surface of the tape reel, and an elastic member configured to bias the abutting member toward the side surface of the tape reel.

The first protrusion may be provided to be movable back and forth in an axial direction of the accommodating portion. The first protrusion may include an engaging portion configured to engage with the side surface of the tape reel.

What is claimed is:

1. A binding machine, comprising:
    an accommodating portion configured to accommodate a tape reel, which has a tubular bobbin and a tape wound around an outer circumferential surface of the bobbin, with a part of the tape pulled out of the accommodating portion, the wound tape including an inner peripheral portion adjacent the outer circumferential surface of the bobbin and an outer peripheral portion at an outer periphery of the wound tape, the wound tape further including a side surface portion extending on a side of the wound tape extending from the inner peripheral portion to the outer peripheral portion;
    a main handle configured to hold the tape pulled out from the accommodating portion; and
    a clincher arm attached to the main handle rotatably in a first direction toward the main handle and a second direction away from the main handle, and configured to grip the tape held by the main handle by rotating in the first direction and further pull out the tape by rotating in the second direction after the gripping, wherein
    the accommodating portion includes:
        a side wall configured to face a side surface of the accommodated tape reel that includes the side surface portion of the wound tape,
        a first protrusion protruding from the side wall, the first protrusion configured to move back and forth in an axial direction of the accommodating portion and configured to fit to the bobbin of the accommodated tape reel so as to rotatably support the tape reel, and
        a second protrusion protruding from the side wall, the second protrusion configured to move back and forth in the axial direction of the accommodating portion and configured to abut with the side surface portion of the wound tape via movement in the axial direction.

2. The binding machine according to claim 1, wherein the second protrusion is configured to abut with an outer peripheral side region of the side surface portion of the wound tape.

3. The binding machine according to claim 2, wherein the second protrusion includes:
    an abutting member configured to abut with the side surface portion of the wound tape, and
    an elastic member configured to bias the abutting member toward the side surface portion of the wound tape.

4. The binding machine according to claim 1, wherein the second protrusion includes:
    an abutting member configured to abut with the side surface portion of the wound tape, and
    an elastic member configured to bias the abutting member toward the side surface portion of the wound tape.

5. The binding machine according to claim 1, wherein the first protrusion includes an engaging portion configured to engage with the side surface of the tape reel.

6. The binding machine according to claim 1, wherein the second protrusion is biased in the axial direction toward the side surface portion of the wound tape by a spring.

* * * * *